(12) United States Patent
Freitas et al.

(10) Patent No.: US 12,475,749 B2
(45) Date of Patent: Nov. 18, 2025

(54) IN-VEHICLE SYSTEM HAVING VOLATILE AND NON-VOLATILE STORAGE AND METHOD OF USING

(71) Applicant: Woven by Toyota, Inc., Tokyo (JP)

(72) Inventors: Mário Freitas, Tokyo (JP); Laurent Fert, Tokyo (JP); Jérôme Peyroutat-Basse, Tokyo (JP); Takeshi Sekiya, Kawasaki (JP); Nik Chizhov, Tokyo (JP); Johan Lindqvist, Tokyo (JP); Vinit Tare, Palo Alto, CA (US); Erik Steggall, Palo Alto, CA (US); Kalyani Oruganti, Palo Alto, CA (US); Parth Patel, Palo Alto, CA (US); Justin Tjoa, Palo Alto, CA (US); Nick Hori, Palo Alto, CA (US)

(73) Assignee: WOVEN BY TOYOTA, INC., Tokyo (JP)

( * ) Notice: Subject to any disclaimer, the term of this patent is extended or adjusted under 35 U.S.C. 154(b) by 255 days.

(21) Appl. No.: 18/310,500

(22) Filed: May 1, 2023

(65) Prior Publication Data
US 2024/0371215 A1    Nov. 7, 2024

(51) Int. Cl.
G07C 5/08    (2006.01)
G07C 5/00    (2006.01)

(52) U.S. Cl.
CPC .............. *G07C 5/085* (2013.01); *G07C 5/008* (2013.01)

(58) Field of Classification Search
CPC ....... G07C 5/085; G07C 5/008; G06F 3/0604; G06F 3/0619; G06F 3/0638; G06F 3/068

USPC .............................................. 701/1
See application file for complete search history.

(56) References Cited

U.S. PATENT DOCUMENTS

| | | | |
|---|---|---|---|
| 11,176,760 B2* | 11/2021 | Mondello | G06F 16/2457 |
| 2007/0122771 A1* | 5/2007 | Maeda | G07C 5/0858 |
| | | | 340/936 |
| 2009/0153312 A1* | 6/2009 | Tanaka | G07C 5/0891 |
| | | | 340/436 |
| 2009/0318121 A1* | 12/2009 | Marumoto | G07C 5/085 |
| | | | 455/414.1 |
| 2010/0208076 A1* | 8/2010 | Kinoshita | G06V 20/56 |
| | | | 348/148 |
| 2011/0304447 A1* | 12/2011 | Marumoto | G07C 5/085 |
| | | | 340/438 |
| 2012/0053778 A1* | 3/2012 | Colvin | G06F 11/0739 |
| | | | 701/31.4 |
| 2014/0257594 A1* | 9/2014 | Hashimoto | G07C 5/085 |
| | | | 701/1 |

(Continued)

*Primary Examiner* — Tuan C To
*Assistant Examiner* — Dominick Mulder
(74) *Attorney, Agent, or Firm* — HAUPTMAN HAM, LLP

(57) ABSTRACT

A method of collecting data in a vehicle includes receiving sensor data from at least one sensor. The method further includes determining whether one or more predetermined conditions are satisfied, wherein the one or more predetermined conditions relate to a rule for collecting sensor data. The method further includes storing the sensor data in a non-volatile memory (NVM) structure in response to a determination that at least one of the one or more predetermined conditions is satisfied. The method further includes storing the sensor data in a volatile memory (VM) structure in response to a determination that none of the one or more predetermined conditions are satisfied.

20 Claims, 7 Drawing Sheets

(56) References Cited

U.S. PATENT DOCUMENTS

| | | | |
|---|---|---|---|
| 2014/0324279 A1* | 10/2014 | Shinohara | G05B 23/0216 |
| | | | 701/31.5 |
| 2015/0287250 A1* | 10/2015 | Niwa | F16H 63/40 |
| | | | 701/51 |
| 2017/0111183 A1* | 4/2017 | Kojima | H04L 12/40169 |
| 2017/0243412 A1* | 8/2017 | Deville | G06F 11/3013 |
| 2018/0174380 A1* | 6/2018 | Kataoka | B62D 15/025 |
| 2019/0009785 A1 | 1/2019 | Lawrenson et al. | |
| 2019/0287319 A1* | 9/2019 | Golov | H03M 7/30 |
| 2019/0302766 A1* | 10/2019 | Mondello | G07C 5/085 |
| 2020/0076895 A1* | 3/2020 | Tsuyunashi | H04N 21/40 |
| 2021/0248842 A1 | 8/2021 | Dittrich et al. | |
| 2021/0294520 A1* | 9/2021 | Aotsuka | G06F 3/0679 |
| 2022/0100427 A1* | 3/2022 | Boehm | G06F 3/0659 |
| 2023/0063057 A1* | 3/2023 | Lee | G06F 3/0679 |
| 2023/0290199 A1* | 9/2023 | Gyllenhammar | G07C 5/085 |
| 2023/0326260 A1* | 10/2023 | Brodt | G07C 5/008 |
| | | | 701/31.4 |
| 2024/0371215 A1* | 11/2024 | Freitas | G07C 5/008 |

* cited by examiner

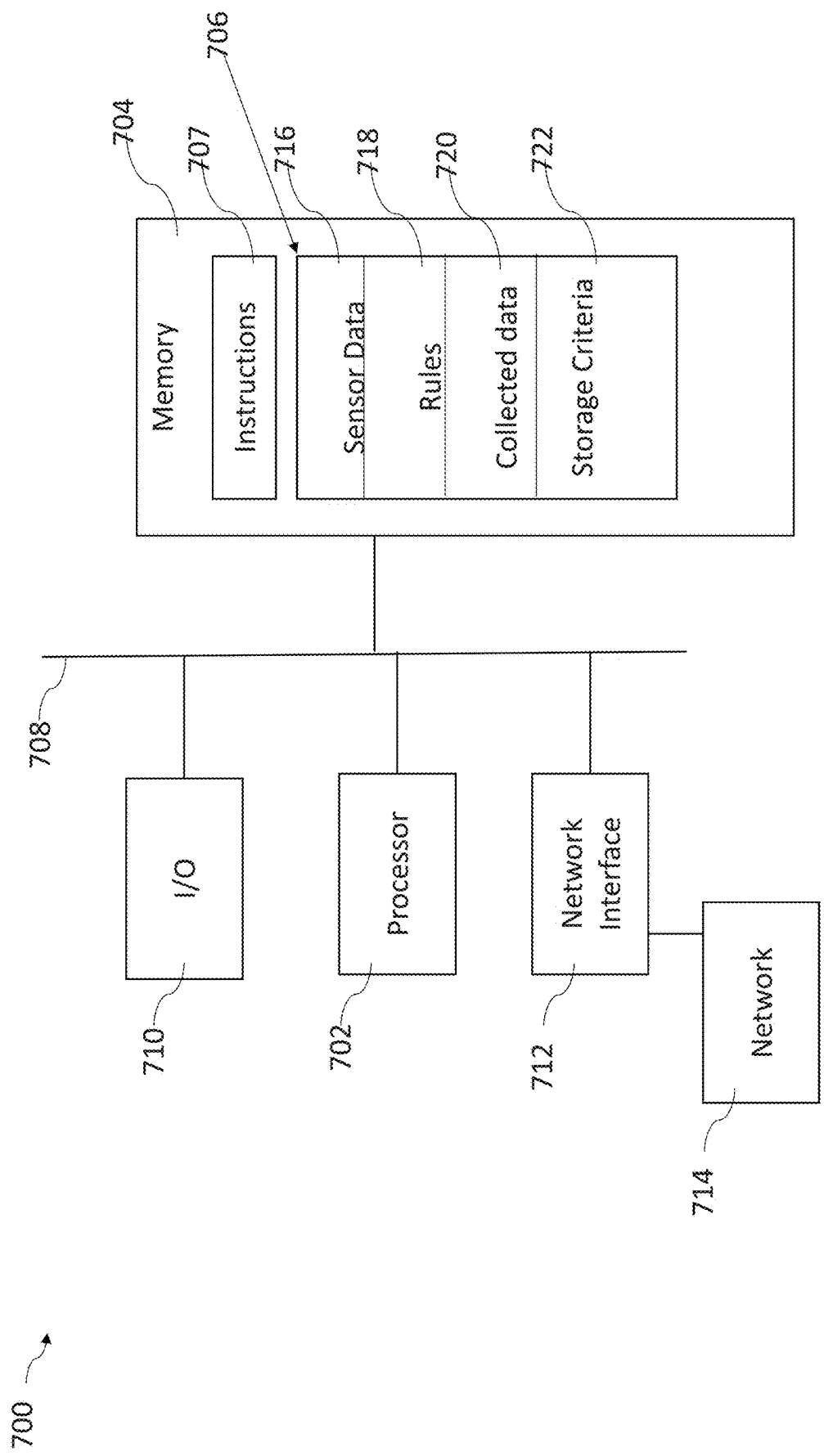

IN-VEHICLE SYSTEM HAVING VOLATILE AND NON-VOLATILE STORAGE AND METHOD OF USING

BACKGROUND

In-vehicle systems have increasing levels of computerized technology. This computerized technology facilitates the use of sensors within the vehicle to collect information regarding the performance of the vehicle or information related to an environment surrounding the vehicle. This information is able to be transmitted to a central server for review and analysis in order to help improve performance of the vehicle or gather information related to environments through which the vehicle travels. In some instances, third parties, such as application developers, insurance companies, or government agencies, submit inquiries for information related to vehicle performance or the environment surrounding the vehicle.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 is a diagram of a system for implementing a request retrieval system in accordance with some embodiments.

DETAILED DESCRIPTION

Figure 1:
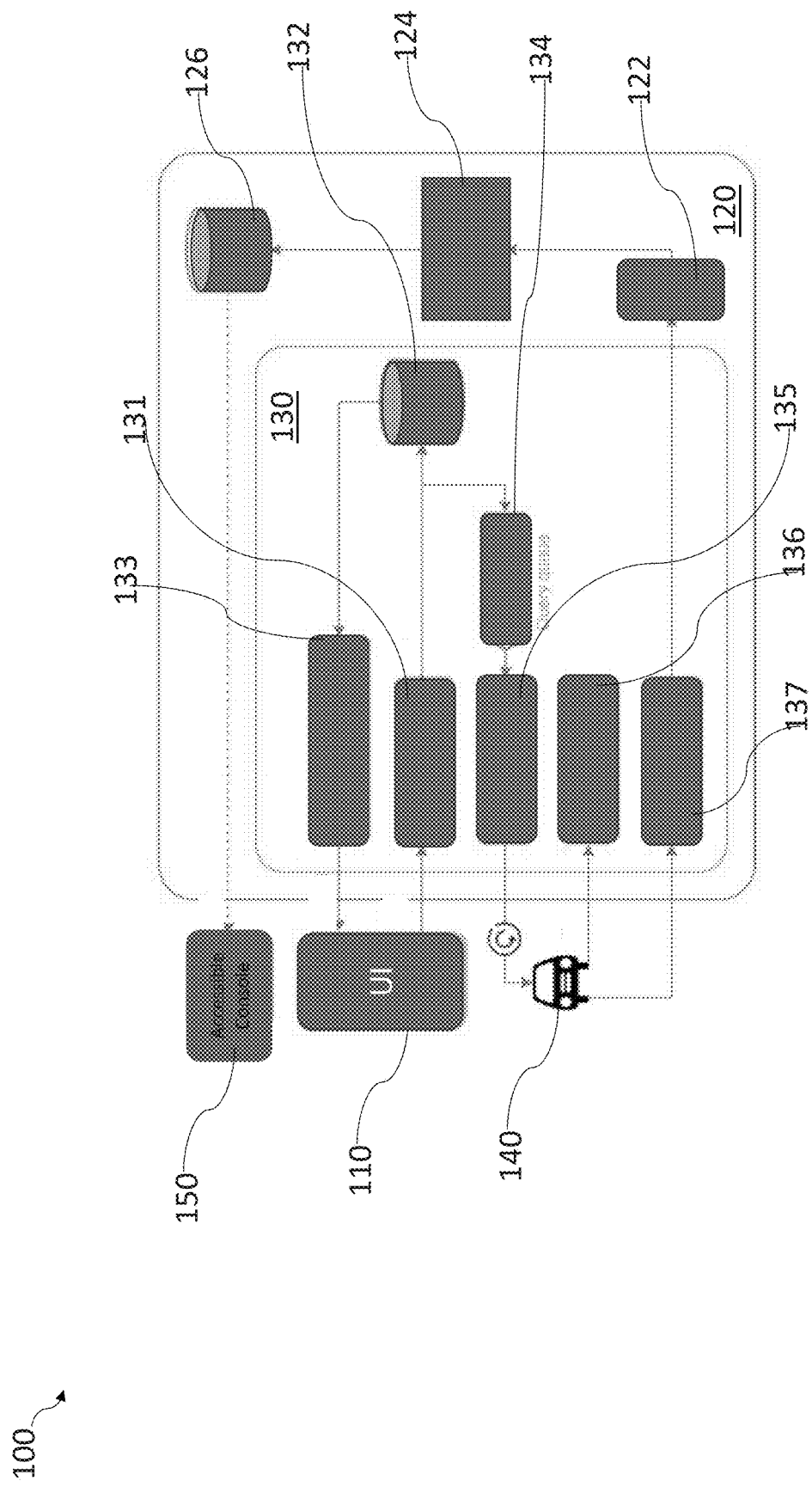
FIG. 1 is a schematic diagram of a request retrieval system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Data collection is usable to fulfill rules or requests received by third party customers based on trigger events detected within one or more vehicles. Data collection for a rule or request occurs in response to a trigger event being detected. In some embodiments, the data collection includes retrieving data stored in a memory within the vehicle. In some embodiments, the data collection includes capturing newly detected data from one or more sensors within the vehicle. In some embodiments, the data collection includes both retrieval of stored data and capturing of new data.

This description includes an in-vehicle system that has two different types of storage mediums, a volatile storage medium (VM) and a non-volatile storage medium (NVM). Including the two different types of storage medium helps to avoid burnout of NVM during rapid data collection, while providing the advantage of NVM for longer term data storage, especially when a risk of low power is possible. If a NVM is burned out then replacement of the storage medium would be an expensive or time consuming process. Additionally, failure to replace the NVM potentially prevents launching of rules for a time period between the burnout and the replacement.

The VM is usable to collect sensor data in situations where confidence that the data will be used is low. For example, confidence in using the data would be low if the data is not associated with a rule; or if the data is associated with a rule that involves collecting past data in response to detecting a trigger event. For example, in response to detecting a trigger event, in some embodiments, data is collected from an accelerometer for the 10 second period prior to detection of the trigger event. However, if the trigger event is not detected, then the accelerometer data is overwritten in a first in first out order to keep a 10 second window of accelerometer data. Since the in-vehicle system has low confidence that the data will be used and overwriting is occurring rapidly, there is a risk of burning out a the cells of a NVM in this situation.

The NVM is usable when confidence that the data will be used; or if the data is to be stored for a prolonged period of time. For example, if a rule is launched on a periodic interval or is part of a rule related to a safety system of the vehicle, then confidence that the data will be used is high. The risk of burnout of the NVM is more worthwhile if confidence that the data will actually be used is high or the data is likely to be requested after a longer period of time.

Since there is a finite amount of resources in each vehicle, the use of two different types of storage medium helps with more efficient usage of the available resources. In turn, the efficient use of resources permits launching and satisfaction of more rules.

In some embodiments, the user is offered a fee for an ability to select a storage medium to be used in satisfaction of rules created by the user. In some embodiments, the user is offered a fee to permit a longer storage duration for data to be able to satisfy a rule that requests data for a longer period of time prior to a trigger event. In some embodiments, this duration prior to the trigger event is called a look back window. For example, in some embodiments, if the look back window defined by a rule is sufficiently long that the data be stored in the NVM, then a fee is charged in comparison with a rule that would have a shorter look back window that could be implemented using the VM.

FIG. 1 is a schematic diagram of a request retrieval system 100 in accordance with some embodiments. The request retrieval system 100 includes a user interface (UI) 110. The UI 110 is configured to receive a user request for data from a vehicle 140. The request retrieval system 100 further includes a server 120 configured to receive the user request from the UI 110; transmit the user request to the vehicle 140; receive data from the vehicle 140; and provide the data to the user via an accessible console 150. The server 120 includes a communication section 130 for communicating with the UI 110 and the vehicle 140. The request retrieval system 100 further includes an accessible console 150 configured to communicate data collected from the vehicle 140 to the user.

The UI 110 is configured to receive input instructions from the user. In some embodiments, the user includes a software developer. In some embodiments, the user includes a machine learning model developer. In some embodiments, the user includes an insurance provider. In some embodiments, the user includes law enforcement. In some embodiments, the user includes market research company. The UI 110 provides options for the user to select what type of vehicle and what type of data is being requested. In some embodiments, the UI 110 is capable of generating the data request using forms related to vehicle identifying information, data types being requested, start time and end time. In some embodiments, the start time and the end time are absolute times, such as Unix time, which is an elapsed time since a Unix epoch time. In some embodiments, the start time and the end time are relative times to the time that the data request is received by the vehicle. In some embodiments, the start time and the end time are relative times to a trigger event. In some embodiments, the UI 110 also provides the user with options for selecting a trigger event and a data collection duration relative to the trigger event. In some embodiments, the UI 110 includes information related to a type of vehicle from which data is requested. In some embodiments, the UI 110 includes vehicle ID which is able to uniquely identify a vehicle as a target of the request. For example, the vehicle ID includes a universally unique identifier (UUID) format. In some embodiments, the UI 110 includes data type that is able to identify the source of the data that user wants to collect. For example, the data type includes sensor ID of sensor that sensor data is collected from, application ID of application that application log is collected from. In some embodiment, the format of the sensor ID and application ID includes a universally unique identifier (UUID) format. In some embodiments, the UI 110 includes drop down menus. In some embodiments, the UI 110 includes editable fields for receiving information related to a data request. In some embodiments, the UI 110 provides information regarding what data option types are available to the user. In some embodiments, the data option types available depend on the user. For example, law enforcement is able to select more data options than an insurance provider in some embodiments.

In some embodiments, the UI 110 includes a graphical user interface (GUI). In some embodiments, the UI 110 includes a mobile terminal, such as a mobile telephone, connectable to the server 120. In some embodiments, the UI 110 includes a web interface such as RESTful API. In some embodiments, the UI 110 includes a computer connectable to the server 120. In some embodiments, the UI 110 is capable of wireless connection to the server 120. In some embodiments, the UI is connectable to the server 120 by a wired connection. The UI 110 is also able to provide the user with updates regarding a status of a data request. In some embodiments, the UI 110 provides status updates regarding a data request in response to an additional query by the user. In some embodiments, the UI 110 provides status updates regarding a data request upon receipt of updated information from the server 120 automatically without user interaction. In some embodiments, the status update causes the UI 110 to trigger an alert for the user. In some embodiments, the alert includes an audio or visual alert.

In some embodiments, the UI 110 includes a means for accepting payment of a fee from the user. In some embodiments, the UI 110 includes data entry fields to permit the user to enter payment card information. In some embodiments, the UI 110 includes a reader for detecting payment card information, such as a magnetic stripe reader, a bar code reader, a chip reader, or another suitable reader.

The server 120 includes a communication section 130 configured to communicate with the UI 110 and the vehicle 140. The communication section 130 includes a receiver 131 configured to receive data requests from the UI 110. In some embodiments, the receiver 131 includes a wireless receiver. In some embodiments, the receiver is configured to receive the data requests via a wired connection. In some embodiments, the receiver 131 is further configured to perform initial processing on the received data request. In some embodiments, the received data request includes priority level information. In some embodiments, the receiver 131 is configured to assign a priority level to the data request based on an identity of the user that submitted the data request or a fee paid by the user that submitted the data request. In some embodiments, the receiver 131 is configured to assign a request identification (ID) number to each received data request. In some embodiments, the server 120 is configured to limit access to certain sensors within the vehicle 140 based on an identity the user. For example, a third-party user will not be able to access sensor related to safety functions of the vehicle 140 in some embodiments.

The communication section 130 further includes a memory unit 132 configured to store data requests received by the receiver 131. In some embodiments, the memory unit 132 includes a random access memory, a solid state memory, or another type of memory. In some embodiments, the memory unit 132 is configured to store the data requests along with a status of the data request. In some embodiments, the status of the data request includes pending (prior to transmission of the data request to the vehicle 140); submitted (following transmission of the data request to the vehicle 140); and completed (following receipt of the requested data from the vehicle 140). In some embodiments, the memory unit 132 is accessible by the user. In some embodiments, updates to information in the memory unit 132 trigger notifications of a user associated with the information updated in the memory unit 132. In some embodiments, the memory unit 132 stores data requests in conjunction with time stamp data indicating a time at which the data request was received. In some embodiments, the memory unit 132 stores data requests in association with a priority level. In some embodiments, the priority level is determined based on an identity of the user. For example, in some embodiments, law enforcement has higher priority than an insurance provider, which has higher priority than a normal user, such as a software developer. In some embodiments, the priority level is determined based on a fee paid by the user. For example, in some embodiments, a user is able to pay a fee in order to increase a priority level of their request in order to obtain the requested data sooner. In some embodiments, the priority level of a data request is increased as an amount of time between initial storage of the data request and transmission of the data request to the vehicle increases.

The communication section 130 further includes a transmitter 133. The transmitter 133 is configured to transmit a status of data requests to the UI 110. In some embodiments, the status of the data requests is wirelessly transmitted to the UI 110. In some embodiments, the status of the data requests is transmitted to the UI 110 via a wired connection. In some embodiments, the transmitter 133 is configured to provide an update on a data request automatically in response to an update in the memory unit 132. In some embodiments, the transmitter 133 is configured to provide an update on a data request in response to a received update request from the user. In some embodiments, the transmitter 133 is configured to automatically transmit a request ID upon initially saving the data request in the memory unit 132. In some embodiments, the status of the data request includes a priority level of the data request. In some embodiments, the status of the data request includes an estimated time until the data request is transmitted to the vehicle 140.

The communication section 130 further includes a query queue 134 configured to store data requests in priority order for transmission to the vehicle 140. In some embodiments, the query queue 134 is integrated into the memory unit 132. In some embodiments, the query queue 134 is separate from the memory unit 132. In some embodiments, the query queue 134 is configured to retrieve data requests from the memory unit 132 based on priority level and time stamp information. In some embodiments, the query queue 134 is configured to order data requests based on priority level; and by time since initial saving in the memory unit 132 in response to data requests having a same priority level.

The communication section 130 further includes a transmitter 135 configured to transmit data requests to the vehicle 140 from the query queue 134. The transmitter 135 is configured to transmit the data requests to the vehicle 140 based on an order of the data requests in the query queue 134. In some embodiments, the data requests are transmitted to the vehicle 140 wirelessly. In some embodiments, the data requests are transmitted to the vehicle 140 by a wired connection. The data requests transmitted to the vehicle 140 include trigger event information, data duration information related to how long before and after the trigger event the data should be collected, and sensor information indicating a type of sensor of the vehicle 140 should collect the data. In some embodiments, the data requests transmitted to the vehicle 140 include priority level information. In some embodiments, the transmitter 135 is configured to transmit data requests to the vehicle 140 when the vehicle 140 sends a request to server 120 to transmit the data requests to the vehicle 140. In some embodiments, the transmitter 135 is configured to transmit data requests to the vehicle 140 any time the communication section 130 has sufficient connectivity to the vehicle 140 to transmit the data request unless the communication section 130 has received information indicating that the vehicle 140 is unable to accept a new data request. In some embodiments, the transmitter 135 is configured to transmit the data requests to the vehicle 140 periodically so long as the vehicle 140 is able to receive new data requests and the transmitter 135 has sufficient connectivity to the vehicle 140. In some embodiments, the transmitter 135 is configured to transmit the data requests to the vehicle 140 in batches, such as in groups of 5 data requests, 20 data requests or some other number of data requests. In some embodiments, the transmitter 135 is configured to request confirmation of receipt of the data request from the vehicle 140. In response to failing to receive confirmation of receipt from the vehicle for a predetermined time period, the transmitter 135 is configured to re-transmit the data request. In some embodiments, the status of the data request stored in the memory unit 132 is updated to indicate submission to the vehicle 140 in response to the communication section 130 receiving confirmation of receipt of the data request from the vehicle 140.

The communication section 130 further includes a receiver 136 configured to receive notification of the occurrence of trigger events from the vehicle 140. In some embodiments, the occurrence of a trigger event is receipt of a data request. In some embodiments, the receiver 136 is configured to receive the notification of the trigger events wirelessly. In some embodiments, the receiver 136 is configured to receive the notification of the trigger events via a wired connection. In some embodiments, the receiver 136 is configured to send a signal to the memory unit 132 to update a status of a data request related to the notified trigger event.

The communication section 130 further includes a receiver 137 configured to receive data from the vehicle 140 responsive to the data requests transmitted by the transmitter 135. In some embodiments, the data is split by the vehicle 140 into data packets that is the unit of transmission from the vehicle 140 to the server 120, and the receiver 137 receives the data packet from the vehicle 140. In some embodiments, the receiver 137 is configured to receive the data wirelessly. In some embodiments, the receiver 137 is configured to receive the data via a wired connection. In some embodiments, the receiver 137 is configured to send a signal to the memory unit 132 to update a status of a data request related to the receipt of requested data. In some embodiments, the data responsive a single data request is received in a single packet from the vehicle 140. In some embodiments, the data responsive to a single data request is received in multiple packets from the vehicle 140. The receiver 137 transfers the received data to a pre-processor 122.

The server 120 further includes the pre-processor 122 configured to receive data from the receiver 137 and perform pre-processing on the data to generate collected data. In some embodiments, the pre-processing includes reforming of data from multiple packets to compile data responsive to a data request. In some embodiments, the pre-processing includes de-serializing of data to compile structured data from a byte array that is received. In some embodiments, the pre-processing includes de-compressing of data if the data is compressed by the vehicle 140 before sending. In some embodiments, the pre-processing includes error correction by Error Correction Code (ECC) such as Reed-Solomon (RS) Code, Bose-Chaudhuri-Hocquenghem (BCH) code, Low-density parity-check (LDPC) code and the like. In some embodiments, the pre-processing includes smoothing of data by removing outlier values to reduce a risk of report incorrect data to the user. In some embodiments, the pre-processing includes associating data request ID information, priority level information or other suitable information with the received data from the receiver 137. In some embodiments, the data is pre-processed so that the information is provided to the user in a format that is easy to understand and does not rely on specialized knowledge or equipment to discern the information.

The server 120 further includes a data storage 126 configured to store the collected data generated by the data pre-processor 122. In some embodiments, the data storage 126 is integrated with the memory unit 132. In some embodiments, the data storage 126 is separate from the memory unit 132. In some embodiments, the data storage 126 includes a solid state drive (SSE), a random access memory or another suitable memory. In some embodiments, the data storage 126 is accessible by the user, e.g., using the UI 110 or an accessible console 150. In some embodiments, the data storage 126 is configured to notify the user in response to data related to a data request is available. In some embodiments, the notification includes an alert to the user. In some embodiments, the alert includes an audio or visual alert. In some embodiments, the data storage 126 is configured to cause the UI 110 or the accessible console 150 to automatically display the notification of an availability of the collected data. In some embodiments, the data storage 126 is accessible by a user using the accessible console 150 without the user submitting a data request. In some embodiments, the data within the data storage 126 are searchable by the user via the accessible console 150. In some embodiments, the collected data is visualized in the console 150.

The request retrieval system 100 further includes a vehicle 140. The vehicle 140 includes sensors to detect both an internal status of the vehicle 140 as well as an external environment surrounding the vehicle 140. In some embodiments, the sensors include a camera, a light distance and ranging (LiDAR) sensor, a radio distance and ranging (RADAR) sensor, a sound navigation and ranging (SONAR) sensor, an accelerometer, a steering wheel position, a speedometer, or another suitable sensor. The vehicle 140 is capable of receiving data requests, either wirelessly or via a wired connection.

In some embodiments, in response to receiving the data request, the vehicle 140 is configured to assign a data request ID to the received data request and the data request is processed to be agnostic to an originating system or program of the data request. In another embodiments, the communication section 130 instead of the vehicle 140 assigns the data request ID, and the data request ID is included in the data request that is sent from the communication section 130 to the vehicle 140. Making the data request agnostic to the originating system or program of the data request helps with expanding an ability of the vehicle 140 to receive and process a wide range of data requests from different users and systems. The vehicle 140 includes a processor for processing the data requests and determining what type of information from which sensors available in the vehicle 140 are capable of satisfying the data request. The vehicle 140 further includes a memory for storing data from the sensors. In some embodiments, the vehicle 140 includes different types of memory. In some embodiments, the vehicle 140 includes volatile memory (VM) and non-volatile memory (NVM). In some embodiments, the VM includes a memory structure such as random access memory (RAM), e.g., dynamic RAM or static RAM, or other suitable volatile memory structures. In some embodiments, the NVM includes flash memory, erasable programmable read only memory (EPROM), ferroelectric RAM, or other suitable types of non-volatile memory structures. VM provides faster data storage and retrieval with a lower risk of burnout of the memory structure. However, VM utilizes power to maintain data within the memory structure, so a loss of power or insufficient power increases a risk that data is lost or corrupted in comparison with NVM. Burnout of a memory structure occurs when the memory structure is repeatedly overwritten and the repeated erasing and re-writing to the memory structure breaks down the components of the memory structure such that the memory structure is no longer able to reliably store data. Due to the nature of NVM, which is able to reliably store data even in low or no power situations, a the NVM structure is more likely to experience burnout than VM structures. In some embodiments, the processor accesses the memory to determine whether any stored data is capable of satisfying the data request. The vehicle 140 is further capable of transmitting the data deemed to satisfy the data request to the server 120 either wirelessly or via a wired connection. In some embodiments, the processor is configured to attempt to satisfy received data requests in a priority order based on a received priority level of the data request. In some embodiments, the vehicle 140 is configured to transmit data to the server preferentially based on the received priority level of the data request.

In some embodiments, the memory and the processor of the vehicle 140 are configured to store and execute software applications in an electronic control unit (ECU) within the vehicle 140. In some embodiments, a data request is generated by the software application stored in the ECU. In some embodiments, the data request is generated in response to a trigger event, such as sudden acceleration, sudden braking, capturing sensor data including specific objects or specific scenes that are predefined in the software application, "crashing" of the software application, a detected abnormality in the software application, or another suitable detected occurrence. In some embodiments, the vehicle 140 is configured to generate a notification to a maintainer, e.g., the user, of the software application in response to detecting a trigger event associated with the software application. In some embodiments, the notification is transmitted, either wirelessly or through a wired connection, directly to the user, e.g., through the UI 110. In some embodiments, the notification is transmitted, either wirelessly or through a wired connection, to the user through the server 120. In some embodiments, the notification includes an audio or visual notification. In some embodiments, the notification is configured to cause the UI 110 to automatically display the notification without user interaction.

The request retrieval system 100 further includes an accessible console 150. The accessible console 150 permits the user to access the collected data stored in the data storage 126. In some embodiments, the accessible console 150 is integrated with the UI 110. In some embodiments, the accessible console 150 is separate from the UI 110. In some embodiments, the accessible console 150 includes another server separate from the server 120. In some embodiments, the accessible console 150 automatically receives collected data related to a data request from the user upon receipt of the collected data by the data storage 126. In some embodiments, the accessible console 150 permits the user to search the data storage 126 to determine whether any of the collected data stored in the data storage 126 are useful to the user without the user submitting a data request.

Using the request retrieval system 100 permits users to obtain information from one or more vehicles 140 in a format that is easy to understand without relying on specialized equipment to request or read the received data. The ability to prioritize data requests in the request retrieval system 100 help to ensure that law enforcement or other user is able to obtain data, while also permitting users to pay a fee to obtain data faster. This flexibility helps to improve the usefulness of the request retrieval system 100 for a wide range of users.

Figure 2:
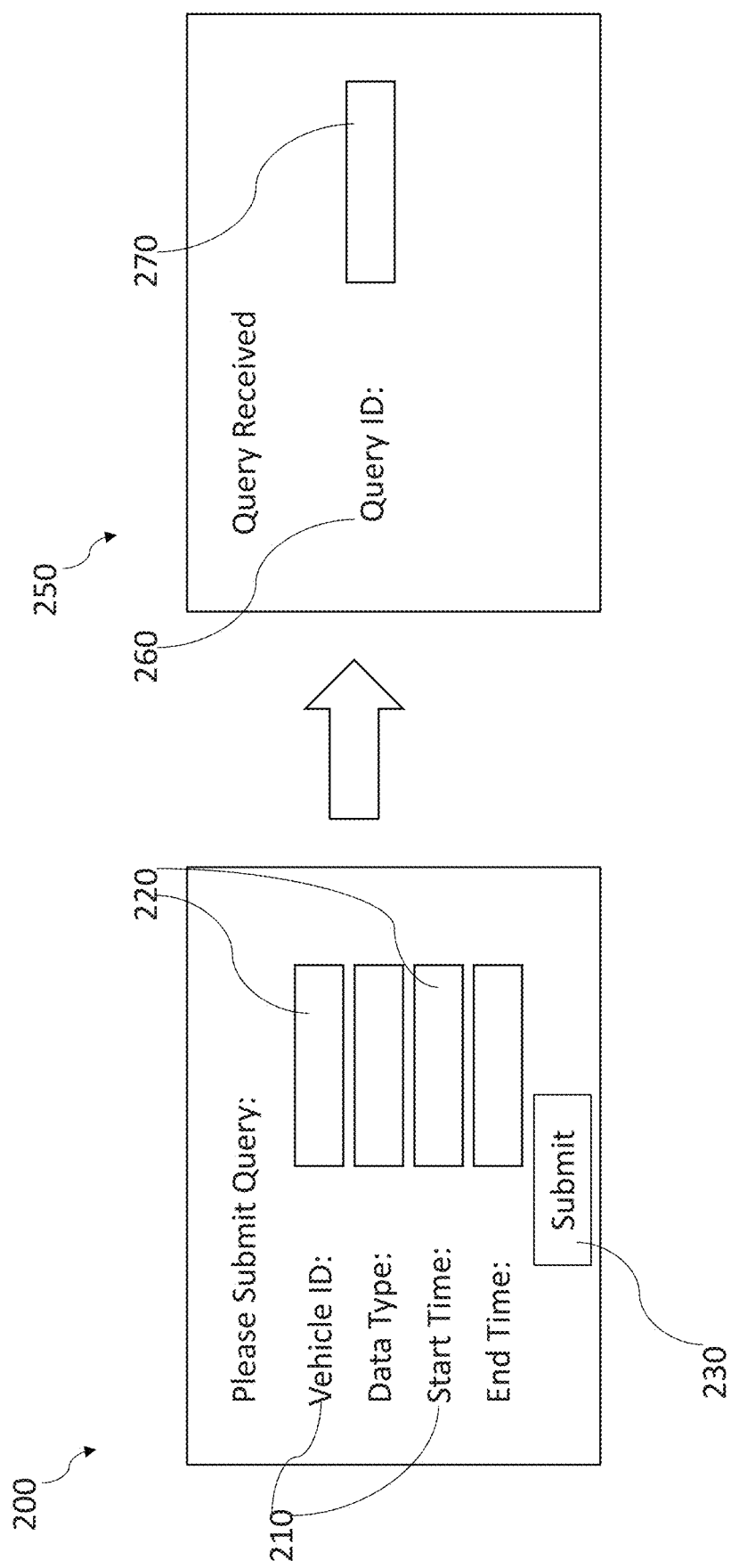
FIG. 2 is views of a graphical user interface (GUI) for a request retrieval system in accordance with some embodiments.

FIG. 2 is views of a graphical user interface (GUI) 200 and 250 for request retrieval system in accordance with some embodiments. In some embodiments, the GUI 200 is usable as UI 110 in request retrieval system 100 (FIG. 1). In some embodiments, the GUI 200 is usable to generate a data request for receipt by the receiver 131 (FIG. 1). The GUI 200 includes a plurality of information types 210 which identify a type of information that the GUI 200 is able to accept from the user. The GUI 200 further includes a plurality of fields 220 configured to receive information related to a corresponding information type 210 of the GUI 200. The GUI 200 further includes a submit button 230 configured to submit a data request to a server, e.g., server 120 (FIG. 1), based on the information in the fields 220. One of ordinary skill in the art would recognize that the names and number of the plurality of information types 210 is merely exemplary and that different numbers and types of information are also within the scope of this disclosure.

In some embodiments, the fields 220 includes fields for users to enter the vehicle ID, the data type, the start time and the end time. In some embodiments, the field 220 further includes a field for users to enter a priority level of the data request. In some embodiments, the GUI 200 further includes information related to how a user is able to increase a priority level of a data request, such as indicating a fee associated with each available priority level. In some embodiments, the GUI 200 includes fields 220 for allowing a user to enter log in information to establish an identity of the user. In some embodiments, the GUI 200 is configured to display a priority level of the user following receiving log in information. In some embodiments, the GUI 200 further includes fields 220 for receiving payment information related to fees for establishing a priority level of a data request.

The GUI 250 is configured to be displayed to the user after the user has selected the submit button 230 on GUI 200. In some embodiments, the GUI 250 is usable as the GUI 110 in the ODDR system 100 (FIG. 1). The GUI 250 includes information indicating that the data request has been received. The GUI 250 includes a query ID label 260 and a query ID field 270. Information for populating the query ID field 270 is received from a server, e.g., server 120 (FIG. 1), following the server receiving and storing the data request. In some embodiments, the GUI 250 includes information of the vehicle ID. In some embodiments, the GUI 250 includes information related to a priority level of the data request. In some embodiments, the GUI 250 includes information regarding a status of the data request, such as pending, submitted, completed, etc. In some embodiments, the GUI 250 includes information related to an estimated time until the data request is submitted to a vehicle, e.g., vehicle 140 (FIG. 1). In some embodiments, the GUI 250 is displayed automatically in response to receipt of query ID information from the server. In some embodiments, the GUI 250 is displayed in response to a user submitting a request for an update on an uploaded data request.

Figure 3:
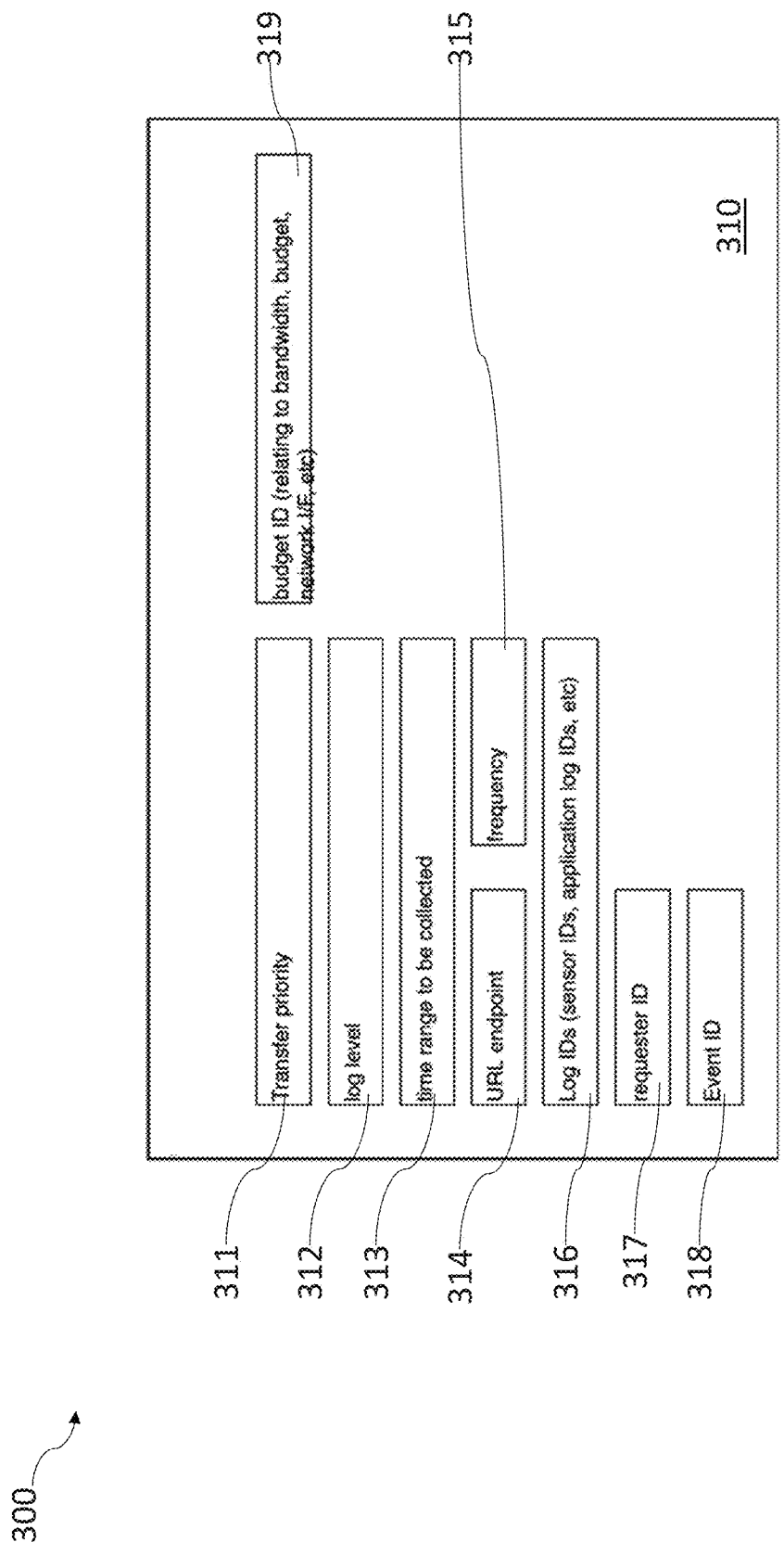
FIG. 3 is a diagram of a data structure of a request retrieval command in accordance with some embodiments.

FIG. 3 is a diagram of a data structure 300 of a request retrieval command 310 in accordance with some embodiments. In some embodiments, the request retrieval command 310 is transmitted from the server 120 to the vehicle 140 (FIG. 1). The request retrieval command 310 includes information related to a type of data sought by a data request to a vehicle, e.g., vehicle 140 (FIG. 1).

The request retrieval command 310 includes a transfer priority parameter 311 that indicates a priority level of the data request. The request retrieval command 310 further includes a log level parameter 312 that indicates what type of data, if any, should be retrieved from other applications on the vehicle. For example, in some embodiments, the request retrieval command 310 retrieves data from an object recognition application. The log level parameter 312 determines what type of data to retrieve from the other application, such as error level or critical level. In some embodiments, the log level parameter 312 is omitted from the request retrieval command 310 or the log level parameter 312 is left in a null state. The request retrieval command 310 further includes a time range to be collected parameter 313 that indicates a time period before and/or after a trigger event to collect data. The time range is corresponding to the start time and the end time that was entered in GUI 200 (FIG. 2) by the users. The request retrieval command 310 further includes a uniform resource locator (URL) endpoint parameter 314 that indicates a destination for the data collected in response to the data request. The request retrieval command 310 further includes a frequency parameter 315 that indicates how often, if ever, the data should be sampled from the rime range 313. For example, when the event time is t=100 sec, the time range comprises start time=−1 sec and end time=2 sec and the frequency is 10 Hz (100 msec cycle), then the data at t=99.0 sec, 99.1 sec. 99.2 sec . . . 101.9 sec, 102.0 sec is collected by the request retrieval command. The request retrieval command 310 further includes a log ID parameter 316 that indicates types of sensors and/or applications usable to collect the data requested by the data request. In some embodiments, unique IDs (such as Universally unique identifier (UUID)) are pre-assigned to all the sensors and applications, and the unique IDs which the user want to collect data from is specified in the log ID parameter 316. The request retrieval command 310 further includes a requester ID parameter 317 that indicates an identity of the user that made the data request. The request retrieval command 310 further includes an event ID parameter 318 that indicates a trigger event associated with the data request. The request retrieval command 310 further includes a budget ID parameter 319 that indicates how much of the resources of the vehicle, e.g., vehicle 140 (FIG. 1), should be allocated to satisfying the data request. One of ordinary skill in the art would understand that additional parameters are possible in the request retrieval command 310. For example, in some embodiments, the request retrieval command 310 includes vehicle location parameter that indicates a geographic area where the trigger event is capable of occurring. One of ordinary skill in the art would also understand that the request retrieval command 310 does not always include all of the parameters in FIG. 3. For example, in some embodiments, the budget ID parameter 319 is omitted.

Figure 4:
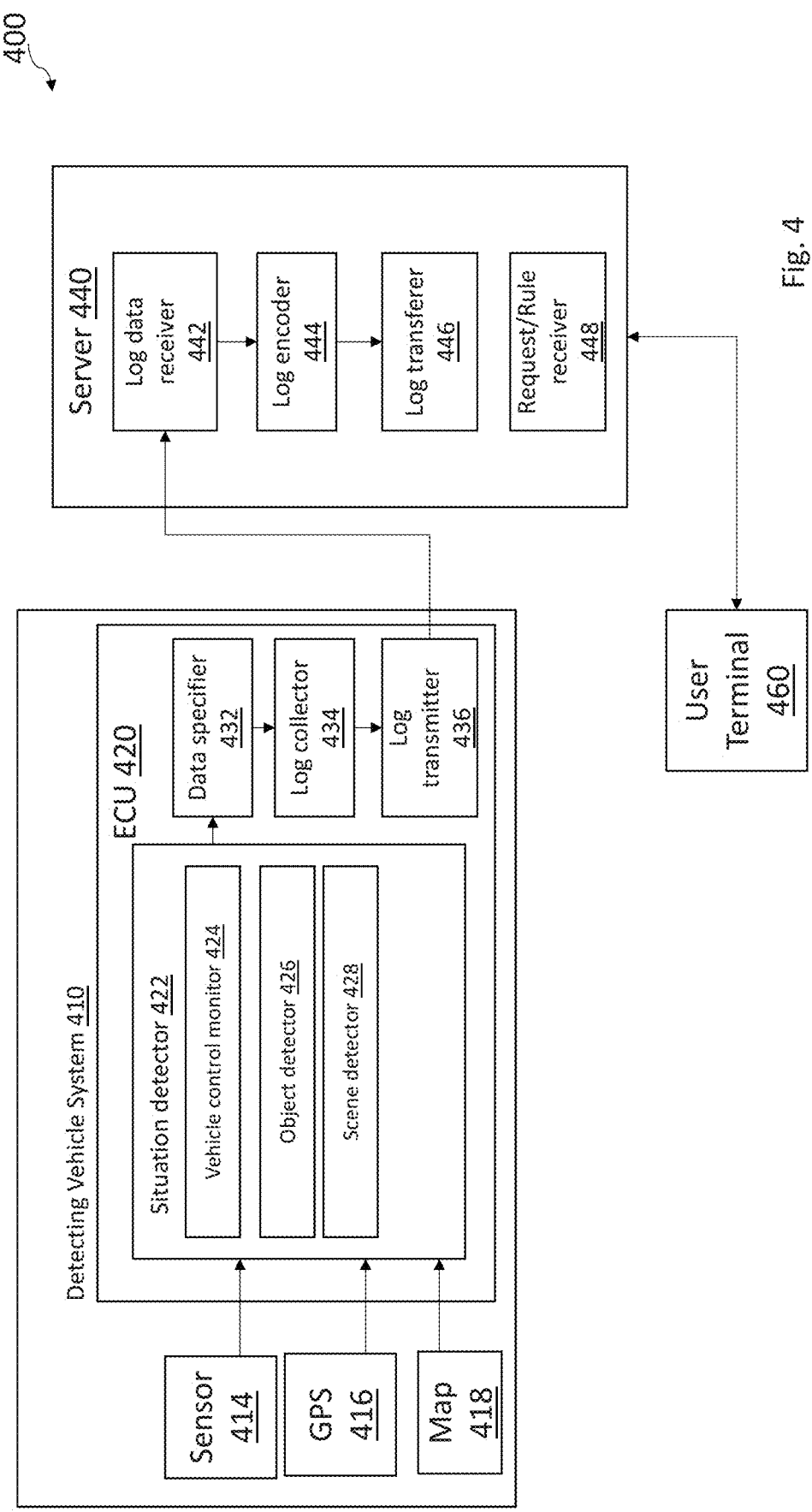
FIG. 4 is a schematic diagram of a request retrieval system in accordance with some embodiments.

FIG. 4 is a block diagram of a request retrieval system 400, in accordance with some embodiments. In some embodiments, the request retrieval system 400 is part of the request retrieval system 100 (FIG. 1). In some embodiments, the request retrieval system 400 is usable in conjunction with the request retrieval system 100 (FIG. 1). In some embodiments, the request retrieval system 400 is separate from the request retrieval system 100 (FIG. 1).

The request retrieval system 400 includes a detecting vehicle system 410 configured to capture information about a vehicle or surroundings of the vehicle. The detecting vehicle system 110 captures information about the vehicle and the surroundings and transmits the information to a server. The request retrieval system 400 further includes a server 440 configured to receive the information, encode the information, and disseminate the information to a user terminal 460.

The detecting vehicle system 410 includes an electronic control unit (ECU) 120 configured to receive data from a sensor 414, a global positioning system (GPS) 416 and a map 416. The ECU 420 includes a situation detector 422, a data specifier 432, a log collector 434 and a log transmitter 436. The situation detector 422 includes a vehicle control monitor 424, an object detector 426, and a scene detector 428.

In some embodiments, the ECU 420 further includes a localization unit configured to receive data from the GPS 416 and the map 418 and determine a position of the vehicle and a pose and state of the vehicle relative to detected and/or known objects and/or road position. A pose is an orientation of the vehicle relative to a reference point, such as a roadway. In some embodiments, the position of the vehicle also refers to a position vector of the vehicle. The pose and state of the vehicle refers to a speed and a heading of the vehicle. In some embodiments, the pose and state of the vehicle also refers to a velocity vector, an acceleration vector and jerk vector of the vehicle. In some embodiments, the position vector, the velocity vector, the acceleration vector, and the jerk vector include angle vector. In some embodiments, the state of the vehicle also refers to whether an engine or motor of the vehicle is running.

The sensor 414 is configured to capture information, such as images, of an environment surrounding the vehicle. In some embodiments, the sensor 414 includes a visible light camera, an IR camera. In some embodiments, the sensor 414 is replaced with or is further accompanied by a light detection and ranging (LiDAR) sensor, a radio detection and ranging (RADAR) sensor, a sound navigation and ranging (SONAR) sensor or another suitable sensor. In some embodiments, the sensor 414 includes additional cameras located at other locations on the vehicle. For example, in some embodiments, additional cameras are located on sides of the vehicle in order to detect a larger portion of the environment to the left and right of the viewing vehicle. Since vehicle occupants are able to look out of side windows of the vehicle, using additional cameras to detect a larger portion of the environment surrounding the vehicle helps to increase precision of detecting objects or scenes surrounding the vehicle. For example, in some embodiments, additional cameras are located on a back side of the vehicle in order to detect a larger portion of the environment to a rear of the vehicle. This information helps to capture information about objects. In some embodiments, the data from the sensor 414 includes a timestamp or other metadata in order to help synchronize the data from the sensor 414 with the data from other components.

The GPS 416 is configured to determine a location of the vehicle. Knowing the location of the viewing vehicle helps to relate an object or scene with determined locations on the map 418.

The map 418 includes information related to the roadway and known objects along the roadway. In some embodiments, the map 418 is usable in conjunction with the GPS 416 to determine a location and a heading of the vehicle. In some embodiments, the map 418 is received from an external device, such as the server 440. In some embodiments, the map 418 is periodically updated based on information from the sensor 414 and/or the GPS 416. In some embodiments, the map 418 is periodically updated based on information received from the external device. In some embodiments, the map 418 is generated from sensor data by simultaneous localization and mapping (SLAM) algorithm. Including the map 418 helps to determine whether an object is a known object. Including the map 118 having known objects helps to increase precision of new object detection.

The situation detector 422 is configured to generate information related to performance of the vehicle and of systems within the vehicle. The situation detector 422 is able to collect information from components within the vehicle, such as the sensor 414, braking systems, acceleration system, and other suitable components. Utilizing this information, the situation detector 422 is able to determine performance of the vehicle. In some embodiments, the situation detector 422 is further configured to monitor performance of software and networking operations within the vehicle. For example, in some embodiments, the situation detector 422 is configured to receive information related to "crashing" of software or applications within the vehicle. In some embodiments, the situation detector 422 is configured to collect information regarding a storage capacity of a memory device within the vehicle. In some embodiments, the situation detector 422 is configured to receive information related to a processing capability of a processor within the vehicle.

The vehicle control monitor 424 is configured to receive sensor data and control logs related to current operation of the vehicle. In some embodiments, the sensor data includes information related to vehicle speed, acceleration, jerk, braking, steering, pitching, rolling, yawing, blinking hazard lamp, horn beeping, or other suitable information. The vehicle control monitor 424 is configured to determine whether any of the received sensor data indicates the satisfaction of a criteria for fulfilling a request, e.g., a trigger event was detected.

The object detector 426 is configured to receive sensor data from the sensor 414 to determine whether any abnormal objects are located in the roadway. In some embodiments, the object detector 426 is further configured to determine whether any objects are present along or adjacent to the roadway. In some embodiments, the sensor data from the sensor 414 includes an image and the object detector 426 is configured to perform image recognition on the received image, e.g., using a trained neural network, to identify abnormal objects. In some embodiments, the object detector 426 is configured to compare any identified objects with information from the GPS 416 and the map 418 to help determine a type of an identified object. In some embodiments, the object detector 426 is configured to identify objects, e.g., a tire, a car part, etc., an animal, a pothole, a traffic regulation board, an emergency vehicle, a vehicle with hazard lights active, or other suitable objects as objects.

The scene detector 428 is configured to receive the sensor data from the sensor 414 to determine whether any scenes are located in an environment surrounding the vehicle that satisfy a condition for fulfilling a request. In some embodiments, the scene detector 428 is configured to determine that a vehicle accident has occurred in response to detecting that two or more vehicles are in contact with one another or that a vehicle is surrounded by multiple fallen objects. In some embodiments, the scene detector 428 is configured to determine that construction is occurring based on detecting multiple construction vehicles in close proximity. In some embodiments, the scene detector 428 is configured to determine that a vehicle is parked on a shoulder of the roadway based on determining that a vehicle is located adjacent to the roadway and is not moving or is moving significantly slower than other vehicles. In some embodiments, the scene detector 428 is configured to use image recognition, such as through a trained neural network, to determine contents of a scene surrounding the vehicle.

In some embodiments, each of the object detector 426 and the scene detector 428 are active during an entire period of operation of the vehicle, e.g., when an engine or motor of the vehicle is running. In some embodiments, at least one of the object detector 426 or the scene detector 428 is activated in response to the vehicle control monitor 424 determining that a specific behavior, e.g., trigger event, was detected.

The data specifier 432 is configured to receive a determination that a fulfillment of a request was performed or that a trigger event was detected. The data specifier 432 is configured to analyze the received information to determine what sensor data from the sensor 414 should be collected based on the received data. For example, in some embodiments where an abnormal steering behavior by the driver is detected, the data specifier 432 is configured to determine that image data from a front camera of the sensor 414 should be captured. Further, the data specifier 432 is configured to determine a time period over which the data from the determine sensor should be collected based on a time of the detected situation. In some embodiments, the data specifier 432 is configured to determine the sensor 414 from which to collect data based on instructions in a received request from user.

In some embodiments, the data specifier 432 is configured to determine a region of the received sensor data that is relevant to the detected situation. In some embodiments, the region of the received sensor data is identified based on object recognition performed on the sensor data, e.g., by the object detector 426 or the scene detector 428. In some embodiments, the data specifier 432 is configured to crop a received image from the sensor data or remove extraneous data from the sensor data if the sensor data is not an image to reduce an amount of information in a log of the abnormal situation. In some embodiments, the data specifier 432 is configured to remove personal information such as license plate, human faces, etc. from the sensor data.

The log collector 434 is configured to receive data from the data specifier 432. In some embodiments, the log collector 434 is configured to receive data directly from the sensor 414, the GPS 416, or the situation detector 422 based on information provided by the data specifier 432. The log collector 434 is also configured to determine what information is useful for identifying the type and location of the object, such as location information from the GPS 416 or the map 418, image information from the sensor 414, cropped or reduced information from the data specifier 432, timestamp information related to a time the object or scene was detected, or other suitable information.

The log collector 434 generates log data based on the received and correlated data, such as the cropped image and location data. The log collector 434 also associates timestamp information with the log data in order to assist with synchronization of the collected data and for queue priority within the server 440. In some embodiments, the log collector 434 generates the log data to further include world coordinates associated with the cropped image. In some embodiments, the log collector 434 generates the log data to further include a map location associated with the cropped image. In some embodiments, the log collector 434 includes additional information to assist in increasing accuracy of determining the object or scene.

While the above description relates to generating log data based on an image from the sensor 414, one of ordinary skill in the art would understand that the log collector 434 is not limited solely to generating log data based on images. In some embodiments, the log collector 434 is configured to generate log data based on information from other sensors attached to the vehicle, such as RADAR, LiDAR, or other suitable sensors. In some embodiments where the occupant is wearing smart glasses, the log collector 434 is further configured to generate the log data based on information received from the smart glasses.

The log transmitter 436 is configured to receive log data from the log collector 434 and transmit the log data to the server 440. In some embodiments, the log transmitter 436 is configured to transmit the log data wirelessly. In some embodiments, the log transmitter 436 is configured to transmit the log data via a wired connection. In some embodiments, the log transmitter 436 is configured to transmit the log data to the user terminal 460 directly. In some embodiments, the log transmitter 436 is configured to transmit the log data to a mobile device accessible by the user, which in turn is configured to transmit the log data to the server 440. In some embodiments, the log transmitter 436 is configured to transmit the log data to the mobile device using Bluetooth® or another suitable wireless technology. In some embodiments, the ECU 420 is configured to determine whether the data transfer rate from the mobile device to the server 440 is higher than a transfer rate from the log transmitter 436 to the server 440. In response to a determination that the data transfer rate from the mobile device to the sever 440 is higher, the log transmitter 436 is configured to transmit the log data to the mobile device to be transmitted to the server 440. In response to a determination that the data transfer rate from the mobile device to the server 440 is not higher, the log transmitter 436 is configured to transmit the log data to the server 440 from the vehicle system 410 directly without transferring the log data to the mobile device.

In some embodiments, the detecting vehicle system 410 further includes a memory configured to store sensor data from sensors attached to the vehicle. In some embodiments, the memory is further configured to store information associated with previously detected objects or scenes. In some embodiments, in response to detecting an object or scene that matches a previous object or scene, the data specifier 434 is configured to provide results based on the matching object or scene. In some embodiments, the detecting vehicle system 410 is further configured to determine whether the detecting vehicle has received from the server 440 information related to an object or scene that matches the determined object or scene from the situation detector 422. In some embodiments, in response to determining that the detecting vehicle has already received information related to the determined object or scene, the detecting vehicle system 410 is configured to prevent transmission of the log data to the server 440. Avoiding transmission of redundant information to the server 440 helps to reduce data transmitted to the server 440 and helps to minimize power consumption by the detecting vehicle system 410. In some embodiment, the storing of the previous requests is called caching. One of ordinary skill in the art would understand caching as using hardware or software to store data so that future requests for that data are able to be served faster.

The server 440 includes a log data receiver 442 configured to receive the log data from the log transmitter 436. In some embodiments, the log data receiver 442 is configured to receive the log data from the mobile device. The server 440 further includes a log encoder 444 configured to encode the log data. The server 440 further includes a log transferrer 446 configured to transmit the encoded log data to the user terminal 160. The server 440 further includes a request/rule receiver 448 configured to receive a request or a rule from the user terminal 460.

The log data receiver 442 is configured to receive the log data from the log transmitter 436. In some embodiments, the log data receiver 442 is configured to receive the log data from the mobile device. In some embodiments, the log data receiver 442 is configured to receive the log data wirelessly. In some embodiments, the log data receiver 442 is configured to receive the log data via a wired connection. In some embodiments, the log data receiver 442 is configured to attach a timestamp for a time that the log data was received to the log data.

The log encoder 444 is configured to encode the received log data according to a predetermined encoding protocol. Encoding the log data according to a predetermined encoding protocol helps to ensure that the user terminal 460 is able to reliably decode the log data for use by the user terminal 460. In some embodiments, the log encoder 444 is configured to perform compression of the log data, image encoding, thumbnail image creation, or other suitable encoding protocols. In some embodiments, the log encoder 444 is configured to perform encryption of the log data. In some embodiments, the log encoder 444 is further configured to perform super-resolution to make the data more visible for the user. One of ordinary skill in the art would understand that super-resolution is a process of receiving a high-resolution image from a low-resolution image. Improving the resolution of the log data helps to reduce false positives or false negatives.

In some embodiments, the server 440 further includes a database for storing received log data. In some embodiments, the log data is stored in the database prior to and/or after encoding by the log encoder 444. In some embodiments, the log data is stored in the database in a priority queue. In some embodiments, the priority of the priority queue is determined based on a time that the object or scene, e.g., a trigger event, was detected, a time that the log data was received by the log data receiver 442, a type of the object or scene, an identity of the driver of the detecting vehicle, or other suitable priority criteria.

The log transferer 446 is configured to receive the encoded log data from the log encoder 444. The log transferer 446 is configured to transmit the encoded to the user terminal 460. In some embodiments, the log transferer 446 is configured to transmit the encoded log data to a mobile device accessible by the user. In some embodiments, the log transferer 446 is configured to transfer the encoded log data wirelessly. In some embodiments, the log transferer 446 is configured to transmit the encoded log data via a wired connection. In some embodiments, the log transferer 446 is configured to transmit encoding protocol information along with the encoded log data. Transmitting the encoding protocol information for the encoded log data helps the mobile device or the user terminal 460 to accurately decode the encoded log data for use by the user terminal 460.

The request/rule receiver 448 is configured to receive new or updated rules or requests for data from a user. In some embodiments, the request/rule receiver 448 is configured to receive the new or updated rules or requests wirelessly. In some embodiments, the request/rule receiver 448 is configured to receive the new or updated rules or request via a wired connection. In some embodiments, the request/rule receiver 448 from the UI 110 (FIG. 1).

In some embodiments, the server 440 is configured to receive location in formation from multiple vehicles. In some embodiments, the server 440 is configured to receive navigation plans from multiple vehicles. In some embodiments, the log transferer 446 is configured to limit the transmission of encoded log data to only vehicles that are within a predetermined distance of the detected trigger event.

In some embodiments, the server 440 is configured to transmit only log data associated with a newly detected trigger event. That is, if the trigger event has already been reported by the server 440, the trigger event is not reported again. Limiting the repetitive reporting of trigger event helps to reduce redundant data received by user terminals to the server 440.

The user terminal 460 is a user terminal accessible by a user associated with a fulfilled request. In some embodiments, the user terminal 460 includes a GUI. In some embodiments, the user terminal 460 is configured to automatically generate an alert in response to received data from the server 440. In some embodiments, the alert includes an audio or visual alert.

One of ordinary skill in the art would understand that modifications to the request retrieval system 400 are within the scope of this disclosure. For example, in some embodiments, the detecting vehicle system 410 is able to transmit log data directly to the user terminal 460 over a network, such as a wireless network. In some embodiments, a mobile device of an occupant in the detecting vehicle is able to transmit log data directly to the user terminal 460, such as a wireless network.

By automatically identifying and disseminating information related to satisfaction of rule or requests detected within the vehicle or in an environment surrounding a vehicle, the user is able to improve performance of applications or software executed using a processing system of the vehicle, e.g., the ECU 420. In some embodiments, the user is able to object information related to events such as accidents.

Figure 5:
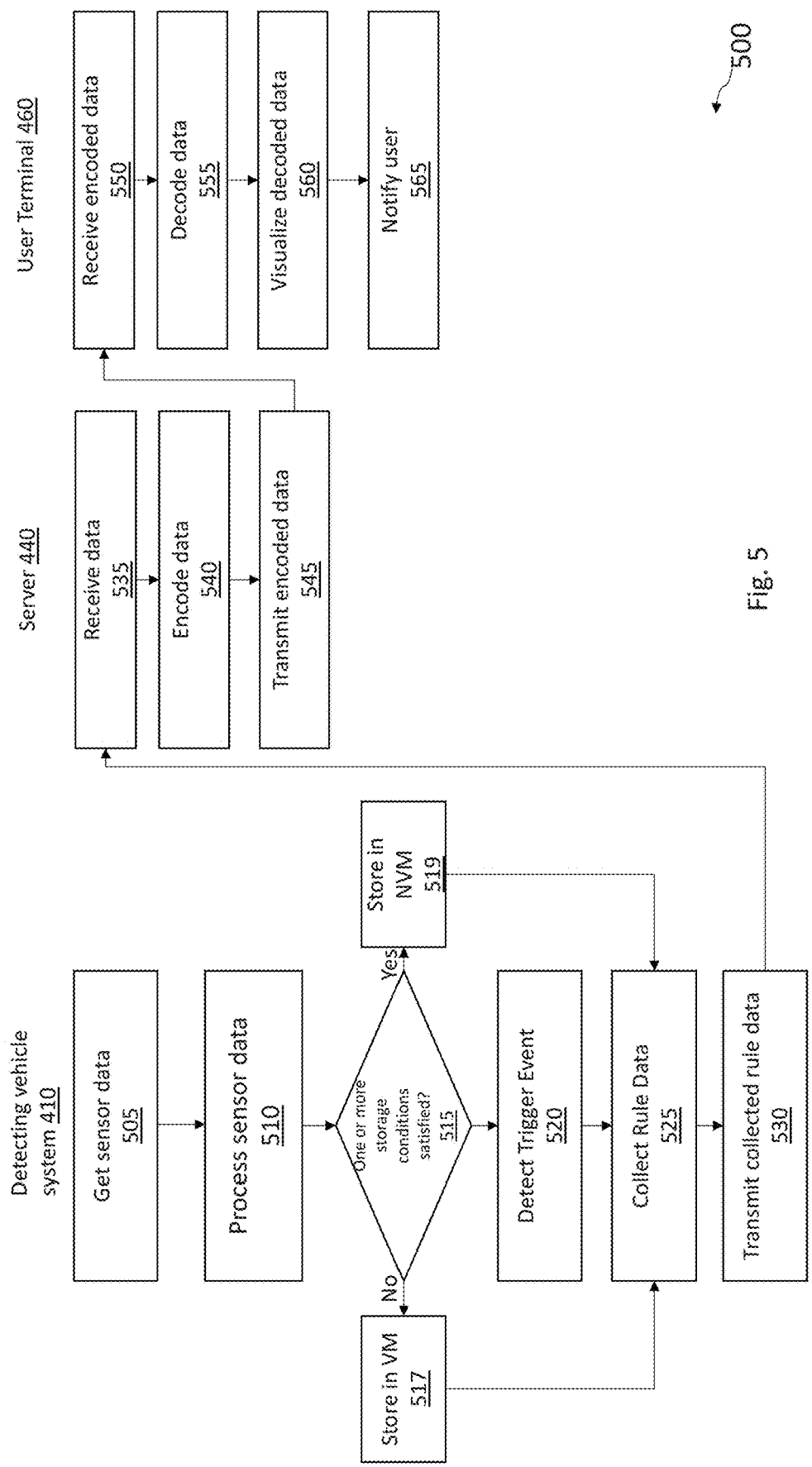
FIG. 5 is a flowchart of a method of implementing a request retrieval system in accordance with some embodiments.

FIG. 5 is a flowchart of a method 500 of implementing a request retrieval system in accordance with some embodiments. In some embodiments, the method 500 is implemented using the request retrieval system 100 (FIG. 1) or the request retrieval system 400 (FIG. 4). In some embodiments, the method 700 is implemented using the request retrieval system 700 (FIG. 7). In some embodiments, the method 500 is implemented using a system other than request retrieval system 100 (FIG. 1), request retrieval system 400 (FIG. 4) or request retrieval system 700 (FIG. 7). The following description relates to processing of a rule or request received by a vehicle.

In operation 505, sensor data is collected. The sensor data is collected by one or more sensors connectable to the vehicle. In some embodiments, the sensor data includes control parameters of the vehicle. In some embodiments, the sensor data includes information related to an environment surrounding the vehicle. In some embodiments, the sensor data includes data from the sensor 414 (FIG. 4) and/or other sensors in the vehicle.

In operation 510, the sensor data is processed. The sensor data is processed to identify one or more trigger events related to one or more rules stored in a memory of the vehicle. In some embodiments, the sensor data is processed by the situation detector 422 (FIG. 4). In some embodiments, the sensor data is processed based on pre-processing instructions related to one or more rules stored in the memory in the vehicle. In some embodiments, the sensor data is processed to remove sensor data for privacy concerns. In some embodiments, the sensor data is processed to compress the sensor data for storage in the vehicle memory.

In operation 515, a determination is made regarding whether one or more storage conditions are satisfied. In some embodiments, the one or more storage conditions are satisfied if confidence is high that the data from operation 510 will be used. In some embodiments, the one or more conditions includes the sensor data having an importance value greater than a threshold value. By saving sensor data that is important in the NVM, a risk that important sensor data is lost if a vehicle is shut down is decreased. In some embodiments, the sensor data is determined have an importance value greater than the threshold value in response to the sensor data being related to vehicle safety, vehicle operation, or other suitable criteria.

In some embodiments, the determination regarding confidence is made based on whether the data is related to a rule that satisfies one or more predetermined conditions. The following discussion will focus on the confidence determination aspect of operation 515, in accordance with some embodiments. In response to a determination that the rule satisfies one or more predetermined condition, the determination is made that there is high confidence that the data will be used. In response to a determination that the rule fails to satisfy any of the one or more predetermined conditions, the determination is made that there is low confidence that the data will be used.

The determination of the operation 515 is made by identifying the types of data sought to be collected for each rule stored in the detecting vehicle system 410. The types of data includes both sensor information that identifies a sensor used to collect the requested data as well as a duration of data collection relative to a trigger event associated with the rule. In response to a determination that the sensor data would not be collected by any of the rules stored in the detecting vehicle system 410, the confidence of using the data is determined to be low.

The predetermined conditions are set based on criteria that indicates that the rule has a high probability to be triggered, that the rule is related to one or more safety systems within the vehicle, or that the user that created the rule paid a fee to use a specific type of storage medium. In some embodiments, the predetermined conditions include whether the rule has been launched and is currently collecting data; whether the rule includes collection of data for a time period prior to detection of a trigger event; a duration of the time period prior to the trigger event for which the data is collected; whether the user paid a fee for use of the NVM; whether the rule is related to one or more safety systems within the vehicle; whether the trigger event is likely to occur; or other suitable predetermined conditions.

If the rule has already been launched and data collection is already occurring, then there is high confidence that the data will be used. Since the data is already being collected the usage of the data is nearly guaranteed to be use used. Therefore, the operation 515 will determine a high confidence that the data will be used.

If the rule includes collection of data prior to the detected trigger event and a duration of the data collection prior to the trigger event is shorter than a first threshold duration, then a confidence that the data will be used is low. In some embodiments, the first threshold duration ranges from 5 seconds to 20 seconds. If the first threshold duration is too short, then a risk over repeated overwriting of the data increases a risk of burnout of the NVM, in some instances. If the first threshold duration is too long, then a risk of loss of a portion of data sought by a rule increases by storing the data in the VM, in some instances, for example, due to low power. Since the duration of the data collection is relatively short, the data will be frequently overwritten. The frequent overwriting of the data increases a risk of burnout of the NVM. Also, the short time period for collection prior to the detected trigger event means that in order for the data to be used the trigger event would be detected within that short time period from the time at which the data was collected. As a result, data for a rule that includes collection for a short period of time prior to a detected trigger event has a low confidence to be used. Therefore, the operation 515 will determine a low confidence that the data will be used.

In contrast, if the rule includes collection of data prior to the detected trigger event and a duration of the data collection prior to the trigger event is equal to or greater than a second threshold duration, then a confidence that the data will be used is high. In some embodiments, the first threshold duration is equal to the second threshold duration. In some embodiments, the second threshold duration ranges from 30 seconds to 1 minute. If the second threshold duration is too short, then a risk over repeated overwriting of the data increases a risk of burnout of the NVM, in some instances. If the second threshold duration is too long, then a risk of loss of a portion of data sought by a rule increases by storing the data in the VM, in some instances, for example, due to low power. Since the duration of the data collection is relatively long, the data is not frequently overwritten; and a risk of burnout of the NVM is reduced in comparison with rules that collect data for a shorter time period prior to the trigger event. Also, the long time period for collection prior to the detected trigger event means that the trigger event is more likely to be detected within the time period for which the data was collected. As a result, data for a rule that includes collection for a long period of time prior to a detected trigger event has a high confidence to be used. Therefore, the operation 515 will determine a high confidence that the data will be used.

If the user has paid a fee for use of the NVM, then the operation 515 determines that a confidence that the data will be used is high. In some embodiments, the detecting vehicle system 410 is notified that a user paid a fee, e.g., using the UI 110 (FIG. 1), in order to utilize the more reliable technology of the NVM. Since the user paid the fee associated with the use of the NVM, then a cost of replacing a burned out NVM in the vehicle is offset by the fee collected from the user.

If the rule is related to one or more safety systems within the vehicle, then the operation 515 will determine that a confidence that the data will be used is high. Since the safety systems within the vehicle are likely to be examined often to help ensure proper functioning, rules related to one or more safety system are likely to be launched and data associated with those rules are likely to be used.

If a trigger event is likely to occur, then the operation 515 will determine that a confidence that the data will be used is high. In some embodiments, a trigger event is an elapse of time, i.e., a periodic trigger event. In such a situation the trigger event will occur repeatedly and the reliable collection of data warrants the use of the NVM.

The above description addresses several predetermined conditions in isolation. In some embodiments, if any single one of the predetermined conditions are satisfied the operation 515 determines that confidence is high that the data will be used. In some embodiments, the detecting vehicle system 410 uses a priority relationship among the rules to resolve a contradiction between predetermined conditions. For example, in some embodiments, if the rule requests data prior to a trigger event for a short period of time; but the rule is related to one or more safety systems in the vehicle, then the operation 515 will determine the confidence of using the data to be high if the predetermined condition related to the safety system has a higher priority than the rule related to the pre-trigger event time duration. In some embodiments, the priority amongst the predetermined conditions is determined by a manufacturer of the vehicle. In some embodiments, the priority amongst the predetermined conditions is adjustable by an operator of a server, e.g., server 440 (FIG. 4).

By determining whether the data is likely to be utilized by the detecting vehicle system 410, the operation 515 helps to improve efficient usage of memory within the detecting vehicle system 410 in order to prolong the useful life of the memory and to help ensure accurate and precise collection of data for satisfying rules. Storing data that is frequently overwritten in VM helps the method 500 reduce the risk of burnout of the NVM and prolong the useful life of the NVM. This, in turn, saves cost for the vehicle owner; and helps with maintaining sufficient resources in the vehicle to continue to satisfy rules for a longer period of time. By storing data that is related to safety systems or that meet other criteria in the NVM, the method 500 helps to ensure that data having higher value to the user, the manufacturer, the owner of the vehicle, or another third party is reliably stored even in low or no power situations.

In response to a determination that a confidence level that the data will be used is low, the method 500 proceeds to operation 517. In response to a determination that a confidence level that the data will be used in high, the method 500 proceed to operation 519. Regardless of the determination in operation 515, the method 500 also proceeds to operation 520.

In operation 517, the data is stored in a VM. In some embodiments, the VM includes RAM, such as dynamic RAM (DRAM) or static RAM (SRAM), or another suitable volatile memory structure. The data stored in the VM is usable to collect rule data in operation 525 in response to detecting of a trigger event associated with a rule that requests the data stored in the VM.

In operation 519, the data is stored in an NVM. In some embodiments, the NVM includes flash memory, EPROM, ferroelectric RAM, or another suitable non-volatile memory structure. The data stored in the NVM is usable to collect rule data in operation 525 in response to detecting of a trigger event associated with a rule that requests the data stored in the NVM.

In operation 520, a trigger event is detected. The trigger event is determined based on one or more rules stored in a NVM or VM in the detecting vehicle system 410. The trigger event is detected using one or more sensors in the vehicle. In some embodiments, the trigger event is a periodic trigger event that results in launching a rule after elapse of a predetermined duration. In response to detection of the trigger event, one or more rules associated with the trigger event are launched.

In operation 525, data is collected based on the one or more rules launched based on the trigger event detected in operation 520. In some embodiments, the rule data is collected from the VM. In some embodiments, the rule data is collected from the NVM. In some embodiments, the rule data is collected from both the VM and the NVM. In some embodiments, multiple different rules request similar or overlapping sensor data. That is, a type of sensor and a time period of data for satisfying a first rule at least partially overlap with the type of sensor and the time period of data for satisfying a second rule. In some embodiments, the first rule satisfies at least one of the predetermined conditions, while the second rule fails to satisfy any of the predetermined conditions. In such a situation the data for satisfying the first rule will be stored in the NVM, while the data for satisfying the second rule is stored in the VM. In some embodiments, in order to conserve resources in the vehicle, the data for satisfying the first rule will be stored in the NVM, while only the data for satisfying the second rule that does not overlap with the data for satisfying the first rule is stored in the VM. In such a situation, the operation 525 would retrieve data from both the VM and the NVM in response to detecting a trigger event associated with the second rule in operation 520. In some embodiments, the collected rule data includes timestamp information related to when the data was collected or when the trigger event was detected. In some embodiments, the collected rule data is stored using a log collector 434 (FIG. 4).

In operation 530, the collected rule data is transmitted to the server 440. In some embodiments, the collected rule data is transmitted wirelessly. In some embodiments, the collected rule data is transmitted via a wired connection. In some embodiments, the collected rule data is transmitted using the log transmitter 436 (FIG. 4).

In operation 535, the transmitted data is received by the server 440. In some embodiments, the data is received by the log data receiver 442 (FIG. 4). In some embodiments, the received data is stored in a memory on the server 440. In some embodiments, the received data is stored in a prioritized queue on the server 440.

In operation 540, the received data is encoded. In some embodiments, the received data is encoded according to a predetermined encoding protocol. In some embodiments, the received data is encoded according to criteria determined by the rule associated with the received data. In some embodiments, the received data is encoded based on a type of data received. In some embodiments, the data is encoded according to a priority of the data in a prioritized queue. In some embodiments, the encoded data is stored in a memory on the server 440. In some embodiments, the encoded data is stored in the memory in a prioritized queue on the server 440. In some embodiments, the operation 540 is omitted and the received data is not encoded.

In operation 545, the encoded data is transmitted to the user terminal 460. In some embodiments, the encoded data is transmitted wirelessly. In some embodiments, the encoded data is transmitted via a wired connection. In some embodiments, the encoded data is transmitted according to a priority of the encoded data in a prioritized queue. In some embodiments, the encoded data is transmitted by the log transferer 446 (FIG. 4).

In operation 550, the encoded data is received. In some embodiments, the encoded data is received by the user terminal 460 (FIG. 4). In some embodiments, the received data is stored in a memory on the user terminal 460 (FIG. 4) prior to decoding. In some embodiments, the received data is stored in a prioritized queue on the user terminal 460 (FIG. 4).

In operation 555, the data is decoded. In some embodiments, the data is decoded according to a predetermined decoding protocol. In some embodiments, the data is decoded based on encoding protocol information received with the data from the server 440. In some embodiments, the data is decoded according to a type of data received. In some embodiments, the data is decoded based on a priority in the prioritized queue. In some embodiments, the decoded data is stored in the memory in the user terminal 460 (FIG. 4). In some embodiments, the decoded data is stored in the memory in the user terminal 460 (FIG. 4) in a prioritized queue.

In operation 560, the decoded data is visualized. Visualizing the decoded data provides a visual representation of the data. In some embodiments, the visual representation includes an image of the data from the vehicle. In some embodiments, the visual representation includes an icon representing the data from the vehicle. In some embodiments, the visual representation includes a table of data. In some embodiments, the visual representation includes text, such as JSON text. In some embodiments, the visual representation includes a location of the detected trigger event on a map. In some embodiments, the decoded data is visualized using the user terminal 460 (FIG. 4).

In operation 465, the user is notified about the visualized data. In some embodiments, the user is notified using a UI, e.g., UI 110 (FIG. 1). In some embodiments, the user is notified using a mobile device accessible by the occupant. In some embodiments, the notification includes an audio or visual alert. In some embodiments, the notification is configured to automatically generate an alert on the mobile device accessible by the user.

One of ordinary skill in the art would understand that modifications to the method 500 are within the scope of this description. In some embodiments, at least one additional operation is included in the method 500. For example, in some embodiments the method 500 further includes receiving a confirmation of the trigger event from an occupant of the vehicle. In some embodiments, at least one operation of the method 500 is excluded. For example, in some embodiments, the operation 540 is excluded and the data is provided to the user terminal 460 without encoding the data. In some embodiments, an order of operation of the method 500 is adjusted. For example, in some embodiments, operation 510 occurs after a determination regarding whether the trigger event is detected to help preserve sensor data. One of ordinary skill in the art would understand that other modifications to the method 500 are within the scope of this description.

Figure 6:
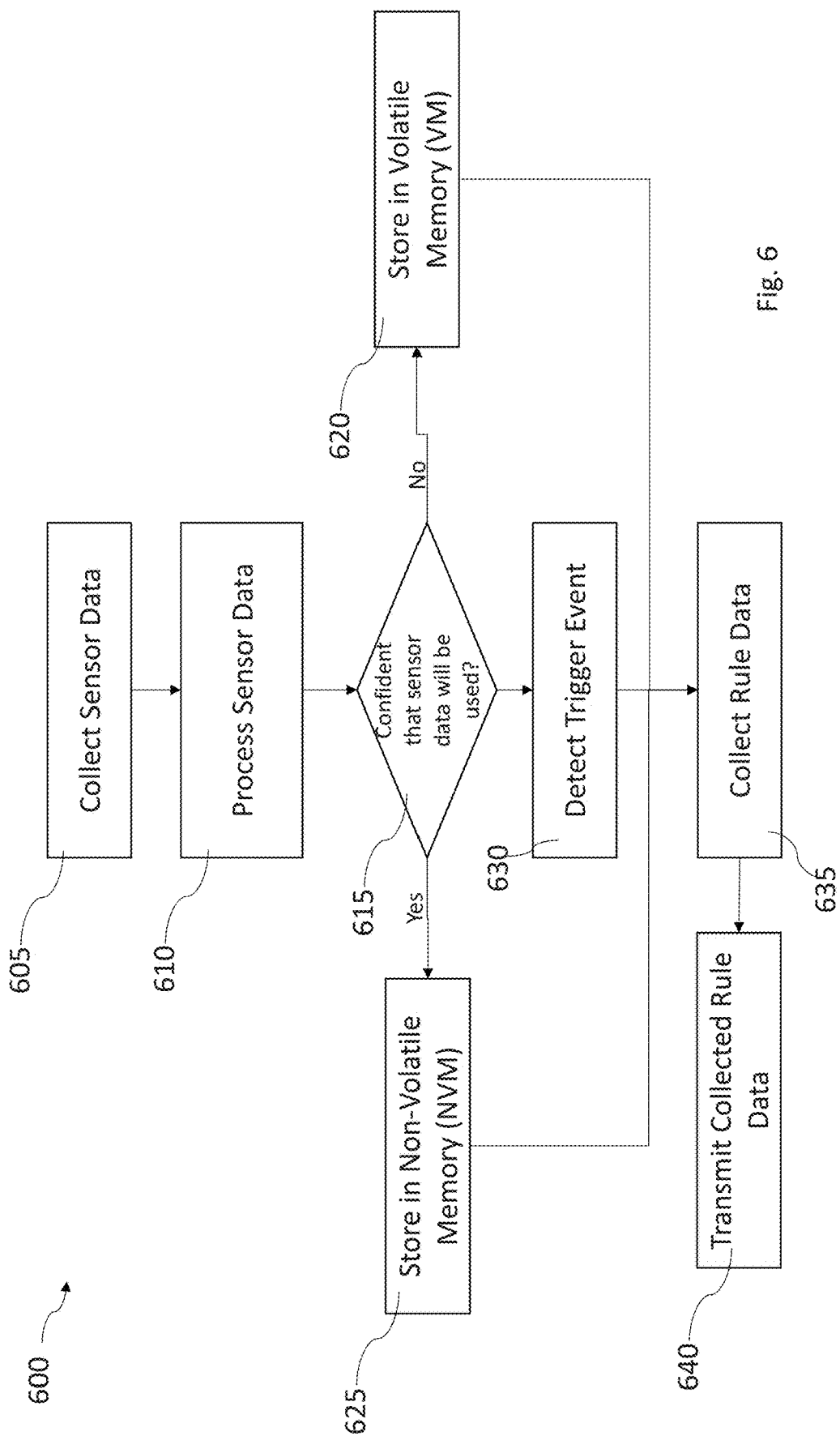
FIG. 6 is a flowchart of method of collecting data using an in-vehicle system in accordance with some embodiments.

FIG. 6 is a flowchart of method 600 of collecting data using an in-vehicle system in accordance with some embodiments. In some embodiments, the method 600 is implemented by one or more operations of the method 500 (FIG. 5). In some embodiments, the method 600 is implemented by the situation detector 422 (FIG. 4). In some embodiments, the method 600 is implemented using the request retrieval system 100 (FIG. 1) or the request retrieval system 400 (FIG. 4). In some embodiments, the method 600 is implemented using a system other than the request retrieval system 100 (FIG. 1) or the request retrieval system 400 (FIG. 4). The method 600 is usable to determine which memory structure to use for storing sensor data based on whether the sensor data is likely to be utilized for satisfying a rule.

In operation 605, sensor data is collected. The sensor data is collected by one or more sensors connectable to the vehicle. In some embodiments, the sensor data includes control parameters of the vehicle. In some embodiments, the sensor data includes information related to an environment surrounding the vehicle. In some embodiments, the sensor data includes data from the sensor 414 (FIG. 4) and/or other sensors in the vehicle.

In operation 610, the sensor data is processed. The sensor data is processed to identify one or more trigger events related to one or more rules stored in a memory of the vehicle. In some embodiments, the sensor data is processed by the situation detector 422 (FIG. 4). In some embodiments, the sensor data is processed based on pre-processing instructions related to one or more rules stored in the memory in the vehicle. In some embodiments, the sensor data is processed to remove sensor data for privacy concerns. In some embodiments, the sensor data is processed to compress the sensor data for storage in the vehicle memory.

In operation 615, a determination is made regarding whether confidence is high that the data from operation 610 will be used. The determination is made based on whether the data is related to a rule that satisfies one or more predetermined conditions. In response to a determination that the rule satisfies one or more predetermined condition, the determination is made that there is high confidence that the data will be used. In response to a determination that the rule fails to satisfy any of the one or more predetermined conditions, the determination is made that there is low confidence that the data will be used. In some embodiments, the operation 615 is similar to the operation 515 (FIG. 5) and a detail description is omitted for the sake of brevity.

By determining whether the data is likely to be utilized, the operation 615 helps to improve efficient usage of memory within the vehicle in order to prolong the useful life of the memory and to help ensure accurate and precise collection of data for satisfying rules. Storing data that is frequently overwritten in VM helps the method 600 reduce the risk of burnout of the NVM and prolong the useful life of the NVM. This, in turn, saves cost for the vehicle owner; and helps with maintaining sufficient resources in the vehicle to continue to satisfy rules for a longer period of time. By storing data that is related to safety systems or that meet other criteria in the NVM, the method 600 helps to ensure that data having higher value to the user, the manufacturer, the owner of the vehicle, or another third party is reliably stored even in low or no power situations.

In response to a determination that a confidence level that the data will be used is low, the method 600 proceeds to operation 520. In response to a determination that a confidence level that the data will be used in high, the method 600 proceed to operation 625. Regardless of the determination in operation 615, the method 600 also proceeds to operation 630.

In operation 620, the data is stored in a VM. In some embodiments, the VM includes RAM, such as dynamic RAM (DRAM) or static RAM (SRAM), or another suitable volatile memory structure. The data stored in the VM is usable to collect rule data in operation 635 in response to detecting of a trigger event associated with a rule that requests the data stored in the VM.

In operation 625, the data is stored in an NVM. In some embodiments, the NVM includes flash memory, EPROM, ferroelectric RAM, or another suitable non-volatile memory structure. The data stored in the NVM is usable to collect rule data in operation 635 in response to detecting of a trigger event associated with a rule that requests the data stored in the NVM.

In operation 630, a trigger event is detected. The trigger event is determined based on one or more rules stored in a NVM or VM in the vehicle. The trigger event is detected using one or more sensors in the vehicle. In some embodiments, the trigger event is a periodic trigger event that results in launching a rule after elapse of a predetermined duration. In response to detection of the trigger event, one or more rules associated with the trigger event are launched.

In operation 635, data is collected based on the one or more rules launched based on the trigger event detected in operation 630. In some embodiments, the rule data is collected from the VM. In some embodiments, the rule data is collected from the NVM. In some embodiments, the rule data is collected from both the VM and the NVM. In some embodiments, multiple different rules request similar or overlapping sensor data. That is, a type of sensor and a time period of data for satisfying a first rule at least partially overlap with the type of sensor and the time period of data for satisfying a second rule. In some embodiments, the first rule satisfies at least one of the predetermined conditions, while the second rule fails to satisfy any of the predetermined conditions. In such a situation the data for satisfying the first rule will be stored in the NVM, while the data for satisfying the second rule is stored in the VM. In some embodiments, in order to conserve resources in the vehicle, the data for satisfying the first rule will be stored in the NVM, while only the data for satisfying the second rule that does not overlap with the data for satisfying the first rule is stored in the VM. In such a situation, the operation 635 would retrieve data from both the VM and the NVM in response to detecting a trigger event associated with the second rule in operation 630. In some embodiments, the collected rule data includes timestamp information related to when the data was collected or when the trigger event was detected. In some embodiments, the collected rule data is stored using a log collector 434 (FIG. 4).

In operation 640, the collected rule data is transmitted to a server, e.g., the server 440 (FIG. 4). In some embodiments, the collected rule data is transmitted wirelessly. In some embodiments, the collected rule data is transmitted via a wired connection. In some embodiments, the collected rule data is transmitted using the log transmitter 436 (FIG. 4).

One of ordinary skill in the art would understand that modifications to the method 600 are within the scope of this description. In some embodiments, at least one additional operation is included in the method 600. For example, in some embodiments the method 600 further includes transmitting a notification to the user terminal, e.g., user terminal 460 (FIG. 4), that the trigger event was detected. In some embodiments, at least one operation of the method 600 is excluded. For example, in some embodiments, the operation 610 is excluded in situations where no raw sensor data is transmitted to the server. In some embodiments, an order of operation of the method 600 is adjusted. For example, in some embodiments, operation 615 occurs prior to the operation 610. One of ordinary skill in the art would understand that other modifications to the method 600 are within the scope of this description.

FIG. 7 is a diagram of a system 700 for implementing a request retrieval system in accordance with some embodiments. System 700 includes a hardware processor 702 and a non-transitory, computer readable storage medium 704 encoded with, i.e., storing, the computer program code 706, i.e., a set of executable instructions. Computer readable storage medium 704 is also encoded with instructions 707 for interfacing with external devices. The processor 702 is electrically coupled to the computer readable storage medium 704 via a bus 708. The processor 702 is also electrically coupled to an I/O interface 710 by bus 708. A network interface 712 is also electrically connected to the processor 702 via bus 708. Network interface 712 is connected to a network 714, so that processor 702 and computer readable storage medium 704 are capable of connecting to external elements via network 714. The processor 702 is configured to execute the computer program code 706 encoded in the computer readable storage medium 704 in order to cause system 700 to be usable for performing a portion or all of the operations as described in request retrieval system 100 (FIG. 1), request retrieval system 400 (FIG. 4), method 500 (FIG. 5), method 600 (FIG. 6).

In some embodiments, the processor 702 is a central processing unit (CPU), a multi-processor, a distributed processing system, an application specific integrated circuit (ASIC), and/or a suitable processing unit.

In some embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 704 includes a compact disk-read only memory (CD-ROM), a compact disk-read/write (CD-R/W), and/or a digital video disc (DVD).

In some embodiments, the storage medium 704 stores the computer program code 706 configured to cause system 700 to perform a portion or all of the operations as described in request retrieval system 100 (FIG. 1), request retrieval system 400 (FIG. 4), method 500 (FIG. 5), method 600 (FIG. 6). In some embodiments, the storage medium 704 also stores information needed for performing a portion or all of the operations as described in request retrieval system 100 (FIG. 1), request retrieval system 400 (FIG. 4), method 500 (FIG. 5), method 600 (FIG. 6) as well as information generated during performing a portion or all of the operations as described in request retrieval system 100 (FIG. 1), request retrieval system 400 (FIG. 4), method 500 (FIG. 5), method 600 (FIG. 6), such as a sensor data parameter 716, a rules parameter 718, a collected data parameter 720, a storage criteria parameter 722 and/or a set of executable instructions to perform a portion or all of the operations as described in request retrieval system 100 (FIG. 1), request retrieval system 400 (FIG. 4), method 500 (FIG. 5), method 600 (FIG. 6).

In some embodiments, the storage medium 704 stores instructions 707 for interfacing with manufacturing machines. The instructions 707 enable processor 702 to generate manufacturing instructions readable by the manufacturing machines to effectively implement method 400 during a manufacturing process.

System 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

System 700 also includes network interface 712 coupled to the processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in ODDR system 100 (FIG. 1), ODDR system 400 (FIG. 4), method 600 (FIG. 6) is implemented in two or more systems 700, and information such as priority level, query ID, query status and query data are exchanged between different systems 700 via network 714.

Supplemental Note 1

A method of collecting data in a vehicle includes receiving sensor data from at least one sensor. The method further includes determining whether one or more predetermined conditions are satisfied, wherein the one or more predetermined conditions relate to a rule for collecting sensor data. The method further includes storing the sensor data in a non-volatile memory (NVM) structure in response to a determination that at least one of the one or more predetermined conditions is satisfied. The method further includes storing the sensor data in a volatile memory (VM) structure in response to a determination that none of the one or more predetermined conditions are satisfied.

Supplemental Note 2

The method of Supplemental Note 1, wherein the one or more predetermined conditions comprise whether the rule has been launched; whether the rule includes a request for collection of data for a time period prior to detection of a trigger event; a duration of the time period prior to the trigger event for which the data is collected; whether a fee was received for the rule to use the NVM; or whether the rule is related to one or more safety systems within the vehicle.

Supplemental Note 3

The method of Supplemental Note 1 or 2, wherein determining whether the one or more predetermined conditions is satisfied comprises determining the one or more predetermined conditions fail to be satisfied in response to the rule including a request for data prior to a detected trigger event for a collection duration shorter than a first threshold duration.

Supplemental Note 4

The method of any of Supplemental Notes 1-3, wherein determining whether the one or more predetermined conditions is satisfied comprises determining the one or more predetermined conditions is satisfied in response to the rule including a request for data prior to a detected trigger event for a collection duration equal to or longer than a second threshold duration.

Supplemental Note 5

The method of any of Supplemental Notes 1-4, wherein the first threshold duration is equal to the second threshold duration.

Supplemental Note 6

The method of any of Supplemental Notes 1-5, wherein determining whether the one or more predetermined conditions is satisfied comprises determining the one or more predetermined conditions is satisfied in response to the rule including a periodic trigger event.

Supplemental Note 7

The method of any of Supplemental Notes 1-6, further comprising detecting a trigger event, wherein the trigger event is associated with the rule; and collecting sensor data in response to detecting the trigger event, wherein collecting the sensor data comprises retrieving the sensor data from at least one of the NVM structure or the VM structure.

Supplemental Note 8

The method of any of Supplemental Notes 1-7, wherein collecting the sensor data comprises retrieving the sensor data from both the NVM structure and the VM structure.

Supplemental Note 9

A system for collecting data in a vehicle includes a non-volatile memory (NVM) structure; a volatile memory (VM) structure, wherein at least one of the NVM structure or the VM structure is configured to store instructions thereon; and a processor connected to the NVM structure and the VM structure. The processor is configured to execute the instructions for receiving sensor data from at least one sensor. The processor is configured to execute the instructions for determining whether one or more predetermined conditions are satisfied, wherein the one or more predetermined conditions relate to a rule for collecting sensor data. The processor is configured to execute the instructions for storing the sensor data in the NVM structure in response to a determination that at least one of the one or more predetermined conditions is satisfied. The processor is configured to execute the instructions for storing the sensor data in the VM structure in response to a determination that none of the one or more predetermined conditions are satisfied.

Supplemental Note 10

The system of Supplemental Note 9, wherein the one or more predetermined conditions comprise whether the rule has been launched; whether the rule includes a request for collection of data for a time period prior to detection of a trigger event; a duration of the time period prior to the trigger event for which the data is collected; whether a fee was received for the rule to use the NVM; or whether the rule is related to one or more safety systems within the vehicle.

Supplemental Note 11

The system of Supplemental Note 9 or 10, wherein the processor is further configured to execute the instructions for determining the one or more predetermined conditions fail to be satisfied in response to the rule including a request for data prior to a detected trigger event for a collection duration shorter than a first threshold duration.

Supplemental Note 12

The system of any of Supplemental Notes 9-11, wherein the processor is further configured to execute the instructions for determining the one or more predetermined conditions is satisfied in response to the rule including a request for data prior to a detected trigger event for a collection duration equal to or longer than a second threshold duration.

Supplemental Note 13

The system of any of Supplemental Notes 9-12, wherein the first threshold duration is equal to the second threshold duration.

Supplemental Note 14

The system of any of Supplemental Notes 9-13, wherein the processor is further configured to execute the instructions for determining the one or more predetermined conditions is satisfied in response to the rule including a periodic trigger event.

Supplemental Note 15

The system of any of Supplemental Notes 9-14, wherein the processor is further configured to execute the instructions for detecting a trigger event, wherein the trigger event is associated with the rule; and collecting sensor data in response to detecting the trigger event, wherein collecting the sensor data comprises retrieving the sensor data from at least one of the NVM structure or the VM structure.

Supplemental Note 16

The system of any of Supplemental Notes 9-15, wherein the processor is further configured to execute the instructions for collecting the sensor data by retrieving the sensor data from both the NVM structure and the VM structure.

Supplemental Note 17

A non-transitory computer readable medium configured to store instructions thereon. The instructions are configured to cause a processor to execute operations for receiving sensor data from at least one sensor. The instructions are configured to cause a processor to execute operations for determining whether one or more predetermined conditions are satisfied, wherein the one or more predetermined conditions relate to a rule for collecting sensor data. The instructions are configured to cause a processor to execute operations for storing the sensor data in a non-volatile memory (NVM) structure in response to a determination that at least one of the one or more predetermined conditions is satisfied. The instructions are configured to cause a processor to execute operations for storing the sensor data in a volatile memory (VM) structure in response to a determination that none of the one or more predetermined conditions are satisfied.

Supplemental Note 18

The non-transitory computer readable medium of Supplemental Note 17, wherein the one or more predetermined conditions comprise whether the rule has been launched; whether the rule includes a request for collection of data for a time period prior to detection of a trigger event; a duration of the time period prior to the trigger event for which the data is collected; whether a fee was received for the rule to use the NVM; or whether the rule is related to one or more safety systems within the vehicle.

Supplemental Note 19

The non-transitory computer readable medium of Supplemental Note 17 or 18, wherein the instructions are further configured to cause the processor to execute operations for detecting a trigger event, wherein the trigger event is associated with the rule; and collecting sensor data in response to detecting the trigger event, wherein collecting the sensor data comprises retrieving the sensor data from at least one of the NVM structure or the VM structure.

Supplemental Note 20

The non-transitory computer readable medium of any of Supplemental Notes 17-19, wherein the instructions are further configured to cause the processor to execute operations for collecting the sensor data by retrieving the sensor data from both the NVM structure and the VM structure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of collecting data in a vehicle, the method comprising:
   receiving sensor data from at least one sensor;
   determining whether one or more predetermined conditions are satisfied, wherein the one or more predetermined conditions relate to a rule for collecting sensor data;
   storing the sensor data in a non-volatile memory (NVM) structure in response to a determination that at least one of the one or more predetermined conditions is satisfied;
   storing the sensor data in a volatile memory (VM) structure in response to a determination that none of the one or more predetermined conditions are satisfied, wherein storing the sensor data in the VM structure is avoided in response to the at least one of the one or more predetermined conditions being satisfied; and
   transmitting the sensor data from at least one of the NVM structure or the VM structure to an external service in response to a received request for the sensor data.

2. The method of claim 1, wherein the one or more predetermined conditions comprise:
   whether the rule has been launched;
   whether the rule includes a request for collection of data for a time period prior to detection of a trigger event;
   a duration of the time period prior to the trigger event for which the data is collected;
   whether a fee was received for the rule to use the NVM; or
   whether the rule is related to one or more safety systems within the vehicle.

3. The method of claim 1, wherein determining whether the one or more predetermined conditions is satisfied comprises determining the one or more predetermined conditions fail to be satisfied in response to the rule including a request for data prior to a detected trigger event for a collection duration shorter than a first threshold duration.

4. The method of claim 3, wherein determining whether the one or more predetermined conditions is satisfied comprises determining the one or more predetermined conditions is satisfied in response to the rule including a request for data prior to a detected trigger event for a collection duration equal to or longer than a second threshold duration.

5. The method of claim 4, wherein the first threshold duration is equal to the second threshold duration.

6. The method of claim 1, wherein determining whether the one or more predetermined conditions is satisfied comprises determining the one or more predetermined conditions is satisfied in response to the rule including a periodic trigger event.

7. The method of claim 1, further comprising:
   detecting a trigger event, wherein the trigger event is associated with the rule; and
   collecting sensor data in response to detecting the trigger event, wherein collecting the sensor data comprises retrieving the sensor data from at least one of the NVM structure or the VM structure.

8. The method of claim 7, wherein collecting the sensor data comprises retrieving the sensor data from both the NVM structure and the VM structure.

9. A system for collecting data in a vehicle, the system comprising:
   a non-volatile memory (NVM) structure;
   a volatile memory (VM) structure, wherein at least one of the NVM structure or the VM structure is configured to store instructions thereon; and
   a processor connected to the NVM structure and the VM structure, wherein the processor is configured to execute the instructions for:
     receiving sensor data from at least one sensor;
     determining whether one or more predetermined conditions are satisfied, wherein the one or more predetermined conditions relate to a rule for collecting sensor data;
     storing the sensor data in the NVM structure in response to a determination that at least one of the one or more predetermined conditions is satisfied;
     storing the sensor data in the VM structure in response to a determination that none of the one or more predetermined conditions are satisfied, wherein storing the sensor data in the VM structure is avoided in response to the at least one of the one or more predetermined conditions being satisfied; and
     transmitting the sensor data from at least one of the NVM structure or the VM structure to an external service in response to a received request for the sensor data.

10. The system of claim 9, wherein the one or more predetermined conditions comprise:
    whether the rule has been launched;
    whether the rule includes a request for collection of data for a time period prior to detection of a trigger event;

a duration of the time period prior to the trigger event for which the data is collected;

whether a fee was received for the rule to use the NVM; or whether the rule is related to one or more safety systems within the vehicle.

11. The system of claim 9, wherein the processor is further configured to execute the instructions for determining the one or more predetermined conditions fail to be satisfied in response to the rule including a request for data prior to a detected trigger event for a collection duration shorter than a first threshold duration.

12. The system of claim 11, wherein the processor is further configured to execute the instructions for determining the one or more predetermined conditions is satisfied in response to the rule including a request for data prior to a detected trigger event for a collection duration equal to or longer than a second threshold duration.

13. The system of claim 12, wherein the first threshold duration is equal to the second threshold duration.

14. The system of claim 9, wherein the processor is further configured to execute the instructions for determining the one or more predetermined conditions is satisfied in response to the rule including a periodic trigger event.

15. The system of claim 9, wherein the processor is further configured to execute the instructions for:

detecting a trigger event, wherein the trigger event is associated with the rule; and collecting sensor data in response to detecting the trigger event, wherein collecting the sensor data comprises retrieving the sensor data from at least one of the NVM structure or the VM structure.

16. The system of claim 2, wherein the processor is further configured to execute the instructions for collecting the sensor data by retrieving the sensor data from both the NVM structure and the VM structure.

17. A non-transitory computer readable medium configured to store instructions thereon, wherein the instructions are configured to cause a processor to execute operations for:

receiving sensor data from at least one sensor;

determining whether one or more predetermined conditions are satisfied, wherein the one or more predetermined conditions relate to a rule for collecting sensor data;

storing the sensor data in a non-volatile memory (NVM) structure in response to a determination that at least one of the one or more predetermined conditions is satisfied;

storing the sensor data in a volatile memory (VM) structure in response to a determination that none of the one or more predetermined conditions are satisfied, wherein storing the sensor data in the VM structure is avoided in response to the at least one of the one or more predetermined conditions being satisfied; and transmitting the sensor data from at least one of the NVM structure or the VM structure to an external service in response to a received request for the sensor data.

18. The non-transitory computer readable medium of claim 17, wherein the one or more predetermined conditions comprise:

whether the rule has been launched;

whether the rule includes a request for collection of data for a time period prior to detection of a trigger event;

a duration of the time period prior to the trigger event for which the data is collected;

whether a fee was received for the rule to use the NVM; or whether the rule is related to one or more safety systems within the vehicle.

19. The non-transitory computer readable medium of claim 17, wherein the instructions are further configured to cause the processor to execute operations for:

detecting a trigger event, wherein the trigger event is associated with the rule; and collecting sensor data in response to detecting the trigger event, wherein collecting the sensor data comprises retrieving the sensor data from at least one of the NVM structure or the VM structure.

20. The non-transitory computer readable medium of claim 19, wherein the instructions are further configured to cause the processor to execute operations for collecting the sensor data by retrieving the sensor data from both the NVM structure and the VM structure.

* * * * *